United States Patent
Scott-Collins et al.

(10) Patent No.: US 12,208,733 B2
(45) Date of Patent: Jan. 28, 2025

(54) BASE ASSEMBLY, REAR VIEW DEVICE AND VEHICLE

(71) Applicant: MOTHERSON INNOVATIONS COMPANY LIMITED, London (GB)

(72) Inventors: Callum Scott-Collins, Portchester (GB); Jakub Spychala, Portchester (GB); Kane Connor, Portchester (GB); Graham Rehill, Portchester (GB)

(73) Assignee: Motherson Innovations Company Limited, London (GB)

( * ) Notice: Subject to any disclaimer, the term of this patent is extended or adjusted under 35 U.S.C. 154(b) by 407 days.

(21) Appl. No.: 17/688,299

(22) Filed: Mar. 7, 2022

(65) Prior Publication Data

US 2022/0305995 A1  Sep. 29, 2022

(30) Foreign Application Priority Data

Mar. 25, 2021  (DE) .................. 10 2021 107 585.8

(51) Int. Cl.
*B60R 1/066* (2006.01)
*B60R 1/072* (2006.01)
(Continued)

(52) U.S. Cl.
CPC .............. *B60R 1/066* (2013.01); *B60R 1/072* (2013.01); *B60R 1/12* (2013.01); *B60R 11/04* (2013.01);
(Continued)

(58) Field of Classification Search
CPC .......... B60R 1/066; B60R 1/072; B60R 1/12; B60R 2001/1253; B60R 2300/8046; H04N 23/57
(Continued)

(56) References Cited

U.S. PATENT DOCUMENTS 4,973,147 A * 11/1990 Fujita .................. H01R 13/743
  359/877
9,340,158 B2 * 5/2016 Nishimura ............... B60R 1/06
(Continued)

FOREIGN PATENT DOCUMENTS

| JP | 2004/196209 A | 7/2004 |
| JP | 2014/213652 A | 11/2014 |
| KR | 200467585 | 6/2013 |

OTHER PUBLICATIONS

German Office Action dated Sep. 1, 2021 of application DE 10 2021 107 585.8.
(Continued)

*Primary Examiner* — Ricky D Shafer
(74) *Attorney, Agent, or Firm* — Jones Day

(57) ABSTRACT

The present disclosure refers to a base assembly of an exterior rear view device to be mounted to a vehicle, comprising a base frame being formed with a door attachment portion for attachment to a door of the vehicle, a head attachment portion for moveably attachment of a head assembly and an arm between said attachment portions; a cover made out of three pieces to mantle the arm from the door attachment portion to the head attachment portion only via snap, clips and/or latch connections, without screws; a camera cradle for attaching a camera to the base frame; a retainer means arranged on the door attachment portion for guiding and sealing harness; a sealing means attached to the door attachment portion; and a harness holder for attachment a harness to the door attachment portion. It also refers to an exterior rear view device with such a base assembly and a vehicle with such an exterior rear view device.

19 Claims, 29 Drawing Sheets

(51) Int. Cl.
  *B60R 1/12* (2006.01)
  *B60R 11/04* (2006.01)
  *H04N 23/57* (2023.01)
(52) U.S. Cl.
  CPC ...... *H04N 23/57* (2023.01); *B60R 2001/1253* (2013.01); *B60R 2300/10* (2013.01); *B60R 2300/8046* (2013.01)
(58) Field of Classification Search
  USPC .......................................................... 359/872
  See application file for complete search history.

(56) References Cited

U.S. PATENT DOCUMENTS

| | | | | |
|---|---|---|---|---|
| 10,759,345 | B2* | 9/2020 | Lettis | H04N 7/183 |
| 11,325,534 | B2* | 5/2022 | Lettis | B60R 1/1207 |
| 11,878,628 | B2* | 1/2024 | Scott-Collins | B60R 1/12 |
| 2010/0296189 | A1* | 11/2010 | Lettis | B60R 1/06 |
| | | | | 359/876 |
| 2012/0235009 | A1* | 9/2012 | Horie | B60R 1/06 |
| | | | | 248/475.1 |
| 2013/0070353 | A1* | 3/2013 | Suzuki | B60R 1/072 |
| | | | | 359/841 |
| 2015/0224930 | A1* | 8/2015 | Foote | B60R 1/076 |
| | | | | 359/872 |
| 2015/0360615 | A1* | 12/2015 | Peterson | B60R 1/06 |
| | | | | 359/841 |
| 2017/0253184 | A1 | 9/2017 | Nishimoto et al. | |
| 2020/0353867 | A1 | 11/2020 | Huizen et al. | |
| 2020/0398755 | A1 | 12/2020 | Lettis et al. | |
| 2021/0213882 | A1* | 7/2021 | Scott-Collins | G03B 17/561 |
| 2022/0305993 | A1* | 9/2022 | Scott-Collins | B60R 1/06 |
| 2023/0303007 | A1* | 9/2023 | Schmierer | B60R 1/076 |

OTHER PUBLICATIONS

Extended European Search Report, Appl. No. 22163887.7, dated Aug. 18, 2022.

* cited by examiner

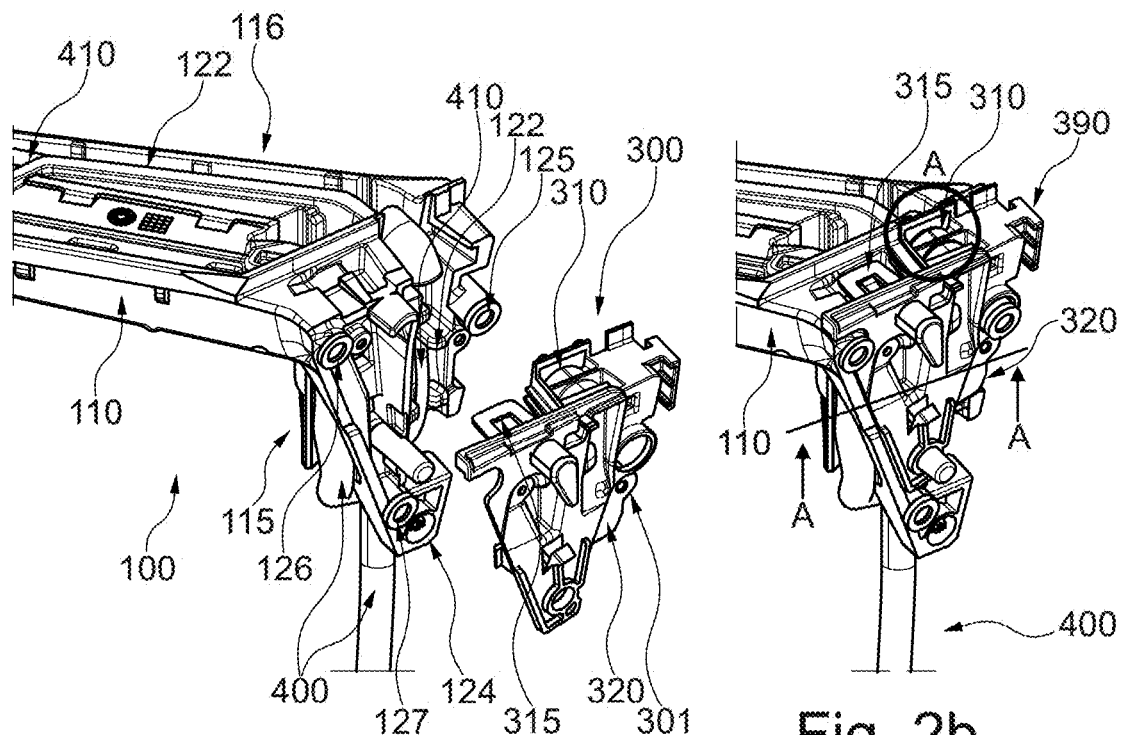
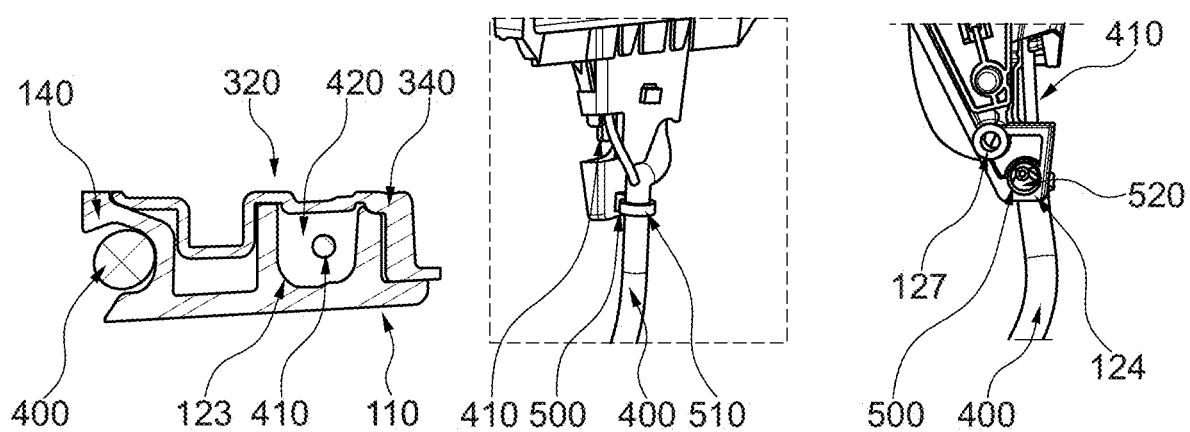
Fig. 2a   Fig. 2b
Fig. 2c   Fig. 2d   Fig. 2e

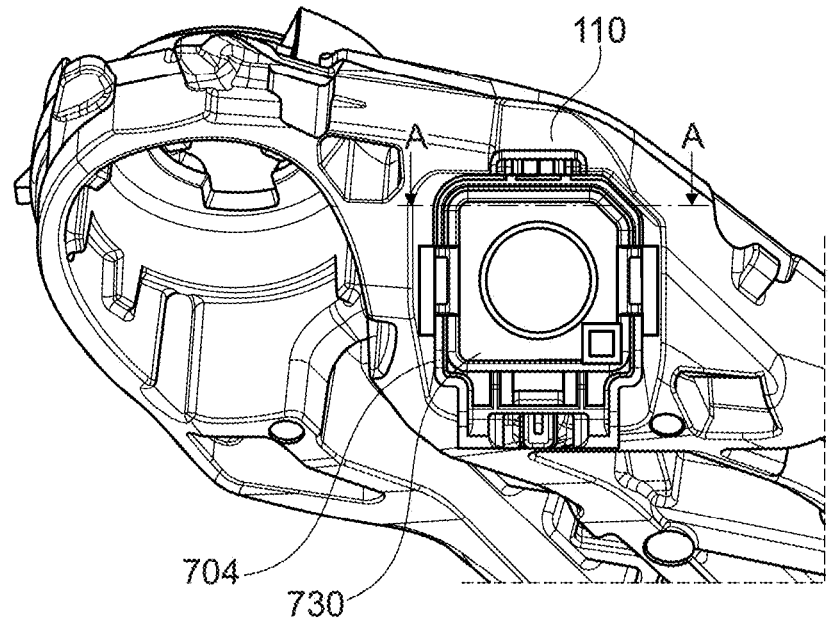
Fig. 8a
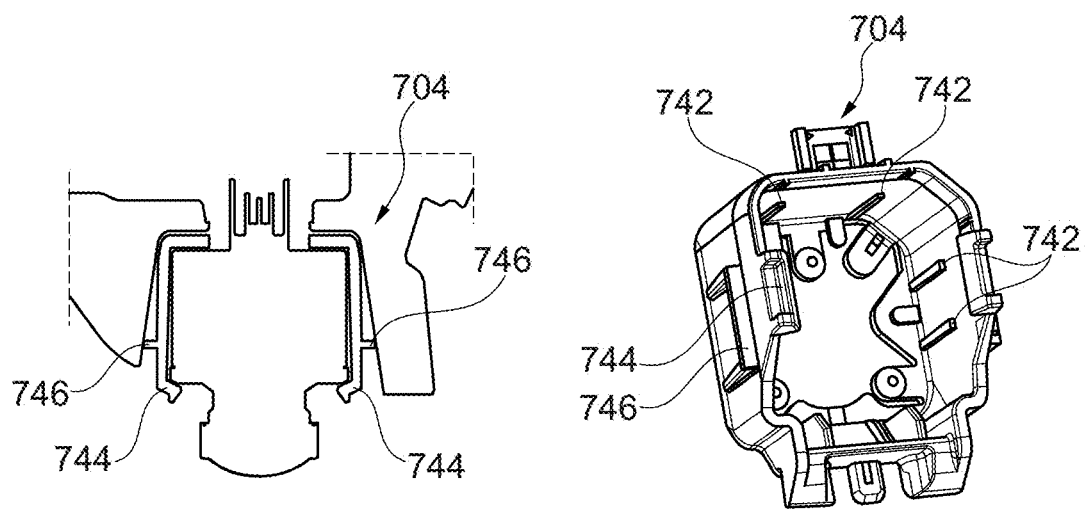
Fig. 8b
Fig. 8c

BASE ASSEMBLY, REAR VIEW DEVICE AND VEHICLE

CROSS-REFERENCE TO RELATED APPLICATIONS

This application claims the benefit of priority to German Patent Application No. DE 10 2021 107 585.8, filed on Mar. 25, 2021, which is incorporated by reference in its entirety for all purposes.

BACKGROUND

1. Field

Systems and methods are presented relating to a base assembly of an exterior rear view device to be mounted to a vehicle, a rear view device with a head assembly and such a base assembly, and a vehicle with such a rear view device.

2. Related Art

A rear view device typically includes a base assembly to be attached to a vehicle and a head assembly to be moveable relative to the base assembly. Generally the head assembly of a rear view device can be rotated between a driving position and a parking position.

The term "rear view" may refer to a view of the surrounding area, which is not in the field of view of a driver of a vehicle, i.e. the directions opposing, left, right, below and above of the viewing direction, but can also comprise the view in the direction of the viewing direction of the driver and/or any combinations of the directions. The rear view can be achieved via at least one rear view element in form of a reflective element like a mirror and/or an image acquisition means like a camera. The rear view, that is the field of view of the driver, can be adjusted by moving, in particular rotating, the reflective element and/or the image acquisition means. This in turn can be realized by moving the complete head assembly together with the reflective element and/or the image acquisition means such that the head assembly of the rear view device can be rotated also between a plurality of viewing position.

For moving the head assembly, the reflective element and/or the image acquisition means an actuator assembly is comprised by the rear view device, which can be controlled by a first control unit within the vehicle. Also the image acquisition means can be controlled via a second control unit, wherein both control units may be formed together. However, for the purpose of controlling data have to be transferred between the rear view device and the control unit within the vehicle requiring a harness.

For facilitating moving the head assembly together with the reflective element and/or the image acquisition means specific pivot joint systems have been developed, see WO 2018/215599 A1, as well as specific actuator assemblies, see WO 2019/002627 A1.

The structure of the base assembly of an exterior rear view device is important as it provides means for connecting the device to a vehicle. US 2020/0001791 A1 refers to a base assembly of an exterior rear view device, comprising a base frame; and a base cover housing the base frame and formed in at least two parts connected to each other, wherein the base assembly comprises a first opening at a first end of the base assembly at which the base frame is configured to be attached to a vehicle and a second opening at a second end of the base assembly at which a head assembly of the exterior rear view device is configured to be attached to the base frame, wherein at least one of a first sealing means at the first opening is provided comprising a two-component gasket with a hard component and a soft component, the hard component comprising: at least one first connection element configured to engage at least one first connection element of a first cover part; and at least one first connection element of a second cover part configured to provide a locking connection between the first cover part and the second cover part, and/or a second sealing means at the second opening is comprising a two-component gasket with a hard component and a soft component, the hard component comprising: at least one second connection element configured to engage at least one second connection element of the first cover part; and at least one second connection element of the second cover part to provide a locking connection between the first cover part and the second cover part.

There is the need that a base assembly fulfills a multitude of functions, comprising:
- attaching a exterior rear view device to a vehicle;
- supporting a head assembly of the exterior rear view device;
- guiding harness from the vehicle to electronic components of the exterior rear view device;
- providing a pleasing appearance which can be adapt the exterior rear view device design to the vehicle design;
- making the rear view device as well as the attachment thereof to the vehicle whether proof;
- providing a water drainage; and
- ensuring safety.

SUMMARY

It is the object of the present disclosure to provide a base assembly of an exterior rear view device to be mounted to a vehicle fulfilling all of the above function.

This object may be achieved with a base assembly of an exterior rear view device to be mounted to a vehicle, comprising a base frame and being formed with a door attachment portion for attachment to a door of the vehicle, a head attachment portion for moveably attachment of a head assembly and an arm between said attachment portions; and a cover made out of three pieces to mantle the arm from the door attachment portion to the head attachment portion only via snap, clips and/or latch connections, in particular without screws; and a camera cradle for attaching a camera to the base frame; and/or a retainer means arranged on the door attachment portion for guiding and sealing harness; and/or a sealing means attached to the door attachment portion; and/or a harness holder in form of a plastic part for attachment of a harness to the door attachment portion.

In one embodiment the three cover pieces are three plastic cover pieces, and/or the three cover pieces comprise a lower base cover, a base cover cap and an upper base cover, and/or the three cover pieces are connected by clip, snap and/or latch connections, with said connections being provided between the three cover pieces, the sealing means and the base frame.

It is proposed that the lower base cover is provided with an opening for the camera attached to the base frame and/or a drain hole, and/or the lower base cover is provided with one or more first attachment means, in particular five clips and a multi-functional assembly projection, for attachment to the base frame; and/or the lower base cover is provided with one or more second attachment means, in particular comprising three hooks, for attachment to the sealing means, in particular a door gasket substrate of the sealing means; and/or the lower base cover has an edge to engage the sealing means, in particular a door seal gasket of the sealing means and/or for an outer sealing; and/or the lower base cover is provided with one or more third attachment means for attachment to the base cover cap, in particular comprising the multi-functional assembly projection and openings, and/or the lower base cover is provided with one or more fourth attachment means for attachment to the upper base cover, in particular comprising a pocket and openings.

It is also proposed that the base cover cap is provided with one or more fifth attachment means for attachment to the lower base cover, in particular comprising peg like projections and a tab; and/or the base cover cap is provided with one or more sixth attachment means for attachment to the upper base cover, in particular comprising peg like projections, a slot and two clips, preferably in form of two leaf spring clips adapted to rest on the base frame at the root and end, allowing the middle portion there between to flex downwards; and/or the base cover cap is provided with one or more seventh attachment means for attachment to the base frame, in particular comprising at least one clip.

Embodiments can be further specified in that the upper base cover is provided with one or more eighth attachment means for attachment to the lower base cover, in particular comprising location pegs and/or at least one clip; the base cover cap is provided with one or more ninth attachment means for attachment to with the base cover cap, in particular comprising clip retention extensions and at least one alignment projection, and/or the upper base cover is provided with one or more tenth attachment means, in particular a hoop clip, for engagement with the sealing element, in particular a projection of the door gasket substrate.

The retainer means may be provided as a plastic unit and/or between the sealing means and the door attachment portion, and/or with at least one opening for allowing at least one datum structural element of the door attachment portion to pass thereto, and/or with at least one guiding projection and/or at least one guiding channel portion for providing at least part of a guiding channel for routing and/or guiding the harness, and/or with at least one sealing portion for covering at least a portion of the at least one harness.

According to embodiments it may be that the at least one opening is provided by a holding portion of the retainer means, with preferably a first opening allowing a location pin of the door attachment portion to pass thereto, and/or at least one second opening allowing a T shaped location projection of the door attachment portion to pass thereto.

Further, it is proposed that at least one first hook and/or clip is provided by the holding portion for attachment to the door panel, and/or at least one second hook and/or clip is provided by the holding portion for attachment to the door attachment portion, with preferably the first and second hook(s) and/or clips(s) extending in opposite directions.

It may also be that the first hook is adapted to hold the rear view device in Y direction to assist an assembly thereof to the door panel, preferably via screws, and/or the first clip determines the final assembly Z position of the rear view device, and/or the first clip is arranged next to the first opening, and/or the first hook provides the at least one second opening, and/or there are at least two second clips.

The retainer means may be provided with at least one datum area and/or with at least one T shaped location projection within a datum area for a base cover.

According to embodiments the sealing means may be arranged between the retainer means and the door attachment portion and/or between the door attachment portion and at least one of the cover pieces, and/or be formed as a 2K door gasket, and/or comprise a door gasket seal and a door gasket substrate, and/or provide a 2-way simultaneous sealing comprising an inner sealing to the base frame and an outer sealing to the cover of the base frame, in particular the lower base cover, and/or to the door panel.

It is proposed that the door gasket seal is formed from rubber and/or with an S shape cross-sectional geometry, and/or the door gasket substrate is formed from plastic and/or with one or more clips, openings, hook pockets, location ribs, projections, screw openings and/or datum areas, and/or the sealing means is formed in one cavity in a 2K tool.

In addition, it may be that the hook pockets provide location and positional control whilst assembling the sealing means to the base frame, and/or the hook pockets and/or the ribs are adapted to be assembled with the lower base cover, and/or the hook pockets and/or the ribs are adapted to lock and locate the sealing means in all three directions, and/or the clips are adapted to assemble with the base frame.

It is proposed that the clips are adapted to assemble with the base frame, with a retainer means being arranged therebetween, and/or the screw openings are adapted for screws to secure the sealing means, preferably together with the retainer means, to the base frame.

With the disclosure it is also proposed that the at least one datum area is adapted to locate the upper base cover and/or to provide the strength of the base frame to the cover thereof, and/or the projection is adapted to secure the whole cover assembly of the base frame by being engaged by a clip, in particular the hoop clip of the base cover.

The base frame, the retainer means and the sealing means may provide a channel being adapted for positioning and/or locating a glass run seal.

The harness holder may be provided as a plastic unit and/or comprise a fixing tie for the harness and a clip for engaging an opening of the door attachment portion.

Embodiments can be further specified in that the camera cradle is removably secured by a friction fit and without any separable attachment element; and/or the camera cradle comprises one or more location ribs in its interior surface in order to hold the camera securely in place and to provide a tuned position of the camera along an x, y, and z axes; and/or the camera cradle comprises at least one of one or more clips configured to frictionally secure the camera to the camera cradle; and/or the camera cradle comprises one or more anti-backout projections configured to fictionally secure the camera cradle to the base frame; and/or the camera cradle is provided as a plastic unit.

It may be that the one or more location ribs comprise three pairs of location ribs, each pair of location ribs being formed in one of three interior walls of the camera cradle; and/or the at least one of the one or more clips comprise two clips formed at a bottom edge of the cradle, wherein, with the camera inserted in the camera cradle, the bottom edge of the camera cradle is the edge of the camera cradle closest to a lens of the camera; and/or the one or more anti-backout projections comprise two anti-backout projections formed proximal to a bottom edge of the cradle, wherein, with the camera inserted in the camera cradle, the bottom edge of the camera cradle is the edge of the camera cradle closest to a lens of the camera.

Further, it is proposed that the base frame is provided as a metal piece, preferably made out of aluminum, and/or the base frame has a modulus of elasticity of at least 12 GPa, preferably between 15 and 75 GPa, and/or the base frame is more rigid than the three cover pieces, the camera cradle and/or the retainer and/or the harness holder.

The present disclosure also provides an exterior rear view device, comprising a head assembly for supporting at least one rear view element, with the head assembly being in a moveable manner, with preferably the at least one rear view element moving together with the head assembly; and a base assembly of the present disclosure.

Also a vehicle with a door having a door panel and supporting a window as well as a cheater panel sealed by a glass run seal is provided with the present disclosure, wherein the door panel also supports the exterior rear view device of the present disclosure.

The glass run seal may be at least partly covered by a wait finisher such that the base assembly extends from the wait finisher.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein:

FIG. 2a is a perspective view of a part of the base frame of FIG. 1b as well as a retainer means of a retainer assembly to be interposed between the base assembly and a vehicle (not shown);

FIG. 2b is a perspective view of the retainer means of FIG. 2a attached to the base frame of FIG. 2a;

FIG. 2c is a cross-section of the retainer means and the base frame of FIG. 2b along line A-A;

FIG. 2d is a perspective view of the lower end of the base frame in FIG. 2a from the opposite side compared to FIG. 2a;

FIG. 2e is a perspective view of the lower end of the base frame in FIG. 2a from the same side as FIG. 2a;

FIG. 3a is a perspective view of a part of the base frame of FIG. 2a;

FIG. 3b is a perspective view of the retainer means of FIG. 2a;

FIG. 3c is a perspective view of retainer means of FIG. 3b attached to the base frame of FIG. 3a;

FIG. 8a is a perspective view of a camera cradle assembled in the base frame of FIG. 1b;

FIG. 8b is a cross-sectional view of the camera cradle as assembled in the base frame along the cross sectional line A-A shown in FIG. 8a;

FIG. 8c is a perspective view of the camera cradle of FIGS. 8a and 8b;

FIGS. 10a and 10b are perspective views demonstrating the assembly of a base cover cap to the sub-assembly shown in FIG. 7a;

DETAILED DESCRIPTION

Figure 9A:
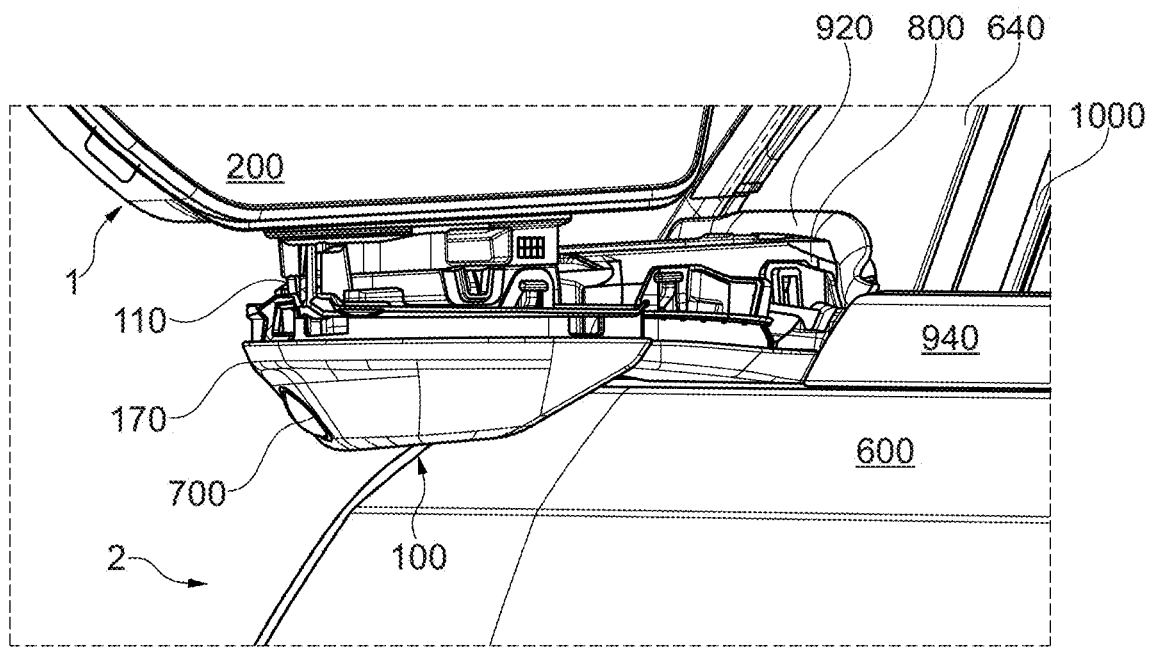
FIG. 9a is a perspective view of the sub-assembly of FIG. 7a attached to the vehicle.
Figure 9B:
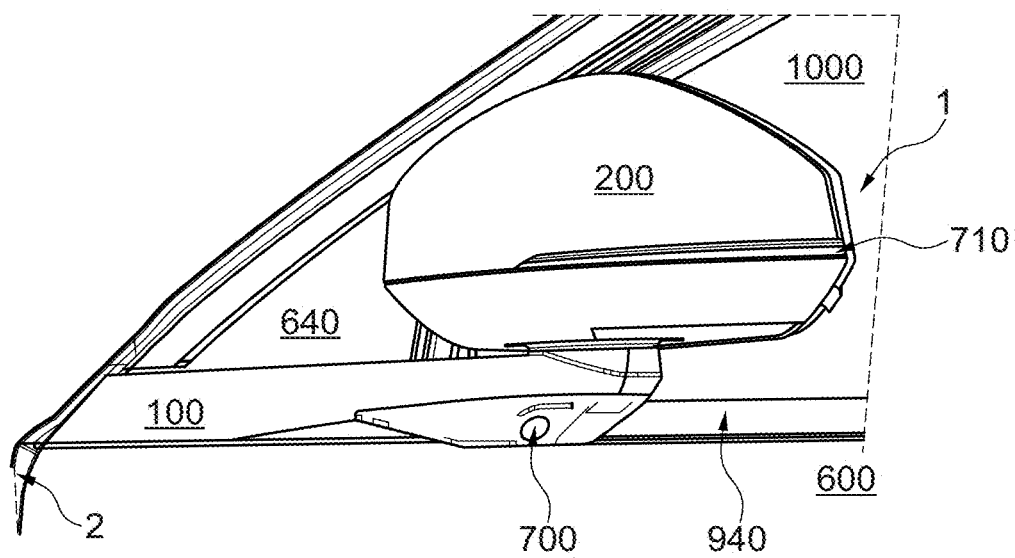
FIG. 9b is a perspective view of an exterior rear view device of the present disclosure and attached to a vehicle of the present disclosure.

FIGS. 1a to 1f show a base cover lower or lower base cover 170 and a base frame 110 of a base assembly 100 of an exterior rear view device 1 mounted to a vehicle 2 as shown in particular in FIG. 9b as well as a sealing means 800. The sealing means 800 is to be attached to both, the lower base cover 170 and the base frame 110 and to be arranged between the base assembly 100 and the vehicle 2. Before describing the attachment of the lower base cover 170, the base frame 110 and sealing means 800 to each other, the structural features of each one of these three elements is described.

Figure 1A:
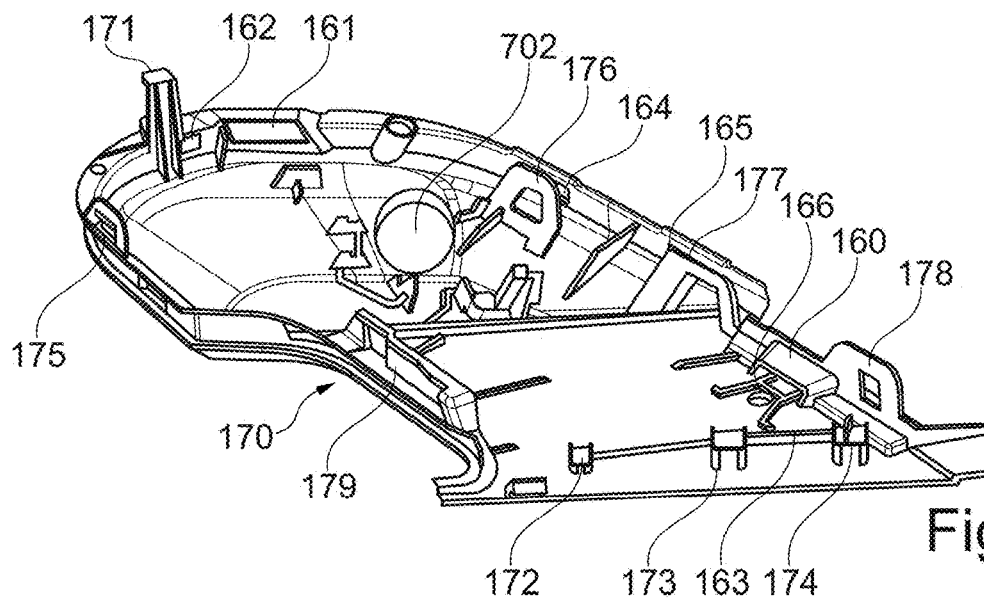
FIG. 1a is a perspective view of a lower base cover of a base assembly of an exterior rear view device of the present disclosure.
Figure 6A:
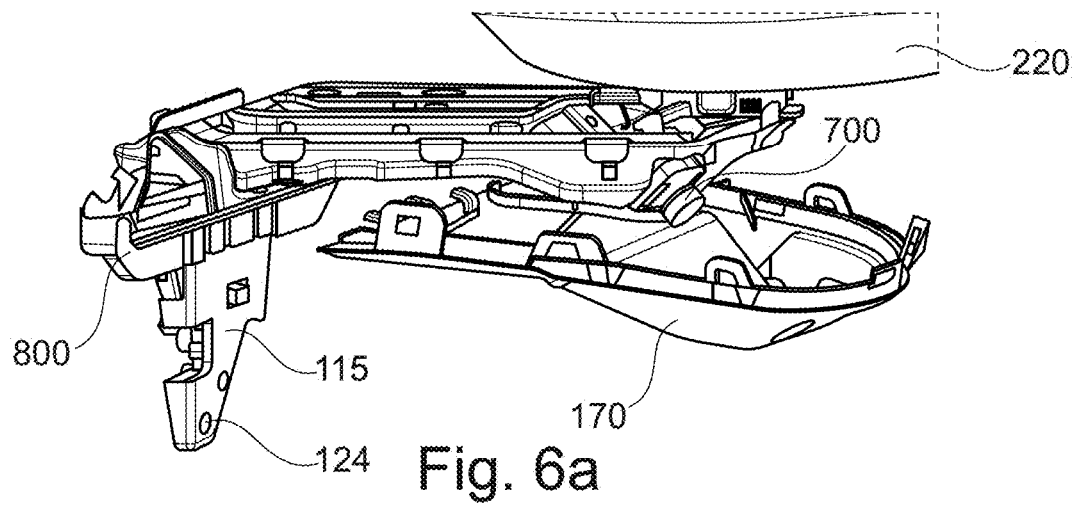
FIGS. 6a to 6c are perspective views demonstrating the attachment of the lower base cover of FIG. 1a to the base frame shown in FIG. 1b to which in particular the retainer assembly of FIG. 5a is attached.
Figure 6B:
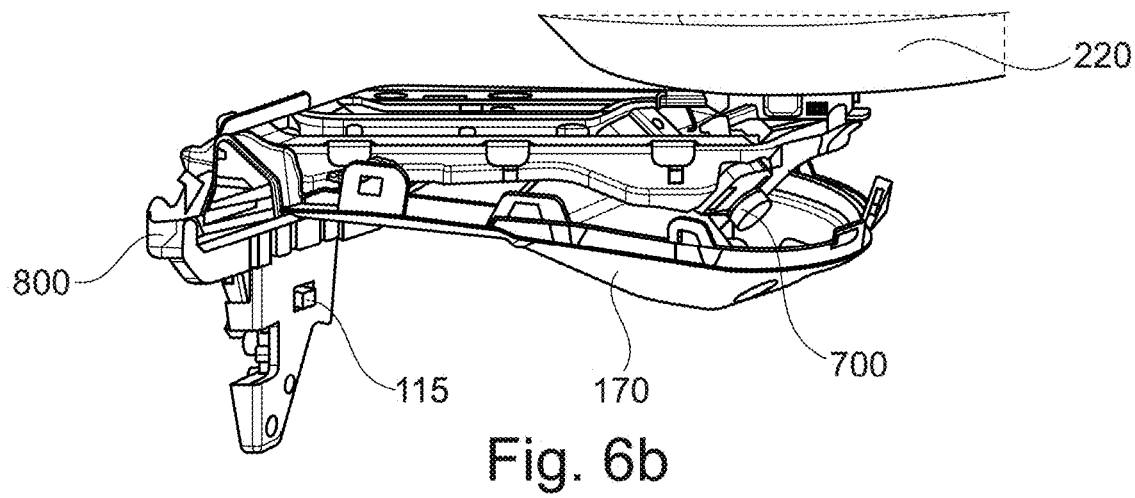

The lower base cover 170 of FIG. 1a is a single plastic piece with a multi-functional assembly projection 171, several hooks 172 to 174, several clips 175 to 179, a pocket 160, several openings 161, 162, 164 and 165 and a wall 163. Further, the lower base cover 170 provides an opening 702 for a camera 700, see FIG. 6b, and a drain hole 166.

Figure 1B:
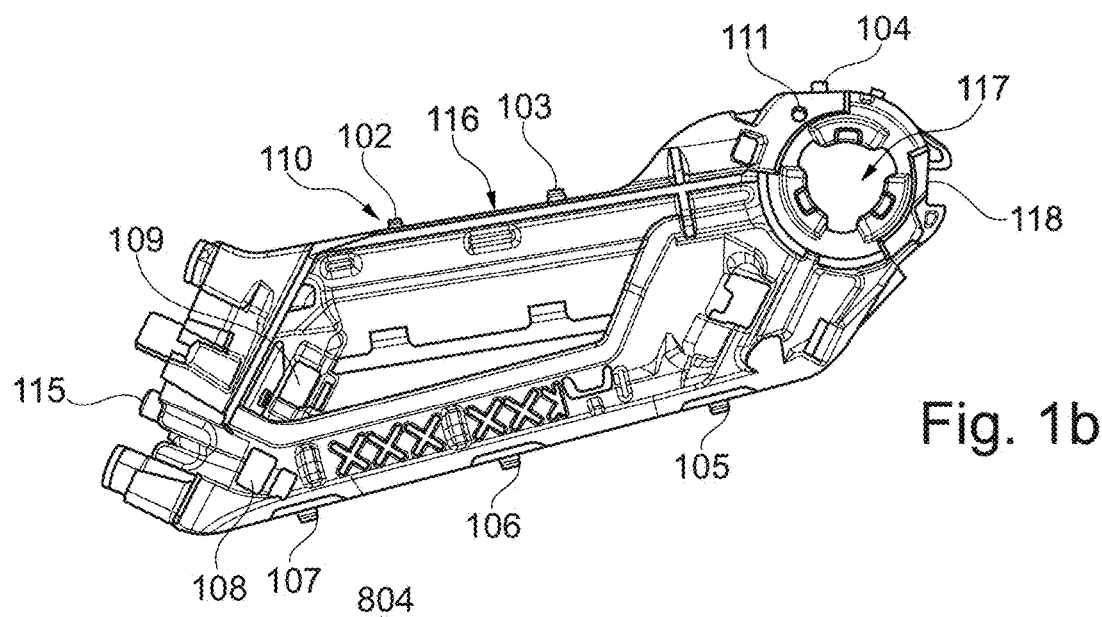
FIG. 1b is a perspective view of a base frame to which the lower base cover of FIG. 1a is to be attached.

The base frame 110 of FIG. 1b is provided in form of an aluminum unit with a plurality of clips 102 to 107 and three hook apertures 108, 109 and 118. The unit can be divided into three portions, i.e. a door attachment portion 115, an arm 116 and a head attachment portion 117, with the door attachment portion 115 running substantially parallelly to a door 600 of the vehicle 1 shown in FIGS. 9a and 9b, whereas the arm 116 extends substantially perpendicularly away from the door attachment portion 115 and the head attachment portion 117 is provided at the end of the arm 116 opposite the one merging with the door attachment portion 115. In the head attachment portion 117 a hole 111 for a tool (not shown) used when dis-assembling cover pieces of the base frame 110. But first, the assembly of said cover pieces is described.

Figure 1C:
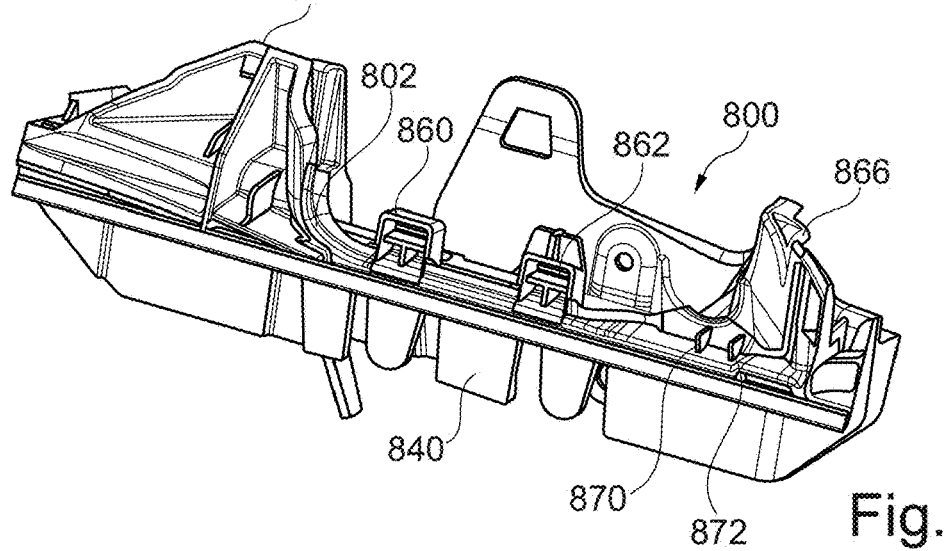
FIG. 1c is a perspective view of a sealing means, to be attached to both the lower base cover of FIG. 1a and the base frame of FIG. 1b.

The sealing means 800 of FIG. 1c is provided in form of a 2K door gasket with a door gasket seal 802 and a door gasket substrate 804. The door gasket substrate 804 is formed with several clips 840 (only one being shown in FIG. 1c), two hook pockets 860 and 862, two location ribs 870 and 872 and one attachment projection 866 discussed in detail below.

Figure 1D:
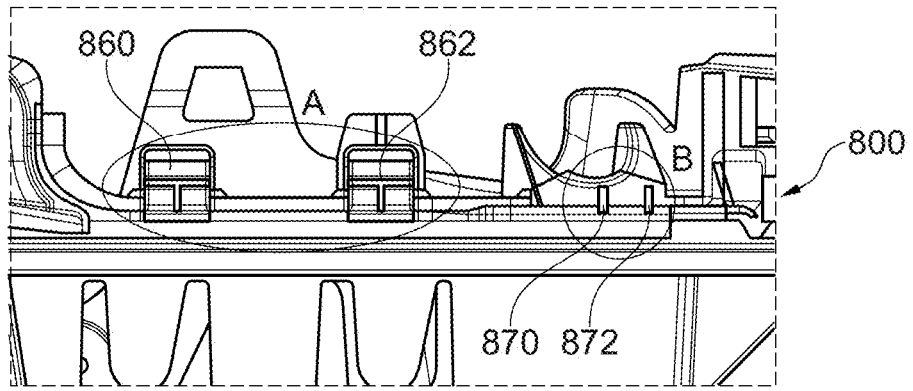
FIG. 1d is a part view of the sealing means of FIG. 1c.
Figure 1E:
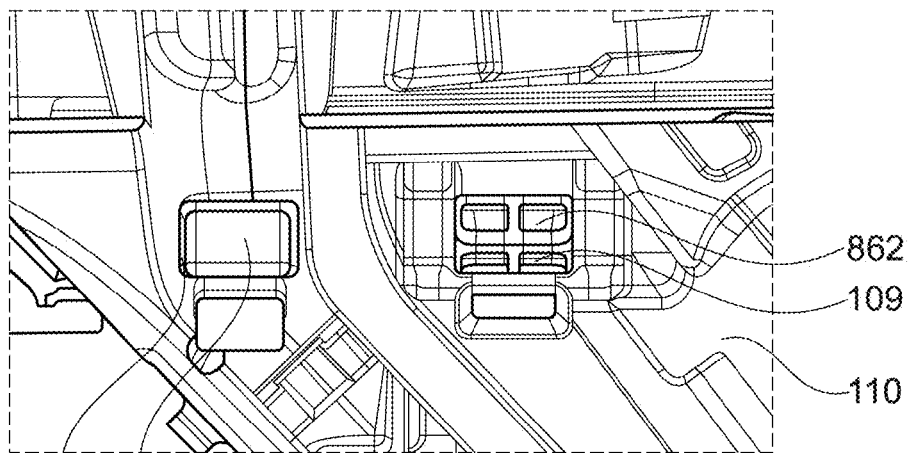
FIG. 1e is a perspective part view of a connection between the sealing means of FIG. 1c with the base frame of FIG. 1b.
Figure 1F:
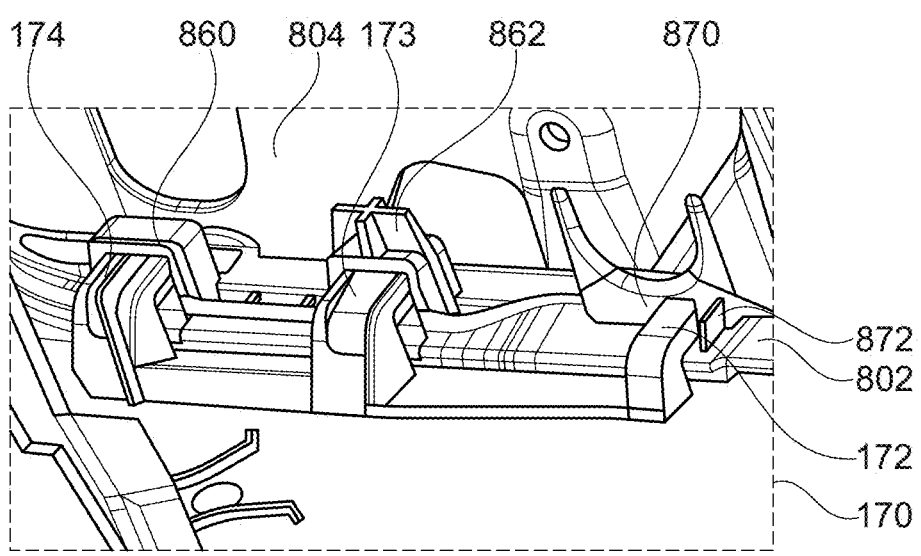
FIG. 1f is a perspective part view of a connection of the lower base cover of FIG. 1a to the sealing means of FIG. 1c.

FIGS. 1d and 1e demonstrate the attachment of the lower base cover 170 of FIG. 1a, being one of three cover pieces of the base frame 110, to the base frame 110 shown in FIG. 1b. The combination of the base frame 110, the sealing means 800 and the lower base cover 170 is shown in FIG. 1f providing a locking system without the need of screws and accommodating a location as well as assembly method.

The lower base cover assembly method allows a secure mounting of the components without using screws, as
  the lower base cover 170 is provided with the three hooks 172 to 174, the five clips 175 to 179 and the multi-functional assembly projection 171,
  the base frame 110 is provided with the two hook apertures 108 and 109, the 5 clips 103 to 107 and a recess or an aperture 118 for the multi-functional assembly projection 171, and
  the sealing means 800 is provided with the two hook pockets 860 and 862 and two hook ribs 870 and 871.

In detail, the hook pockets 860 and 862, provided by the door gasket substrate 804 and shown in region A in FIG. 1d, are door gasket location features with multiple functions. They provide location and positional control whilst assembling the sealing means 800 to the base frame 110, with the hook pockets 860 and 862 of the sealing means 800 passing through the hook apertures 108 and 109 of the base frame 110 as soon as the sealing means 800 is attached to the base frame 110, see FIG. 1e. Along with the two ribs 870 and 872, shown in region B in FIG. 1d, the hook pockets 860 and 862 are used to assemble the lower base cover 170. As shown in FIG. 1f, the hooks 173 and 174 of the lower base cover 170 are engaged within the hook pockets 860 and 862 of the sealing means 800. Further the third hook 172 of the lower base cover 170 is located between the two ribs 870 and 872 of the sealing means 800. Thus, the hook pockets 860 and 862 and the ribs 870 and 872 of the sealing means 800 lock and locate the door gasket seal in all X+Y+Z directions. Critically the Z direction is locked which allows an accurate positional location for the sealing strategy.

Before further describing said sealing strategy, the assembly of the base frame 110 with a retainer means 301 and to a door panel 605 is described with reference to FIGS. 2a to 3d.

Figure 3A:
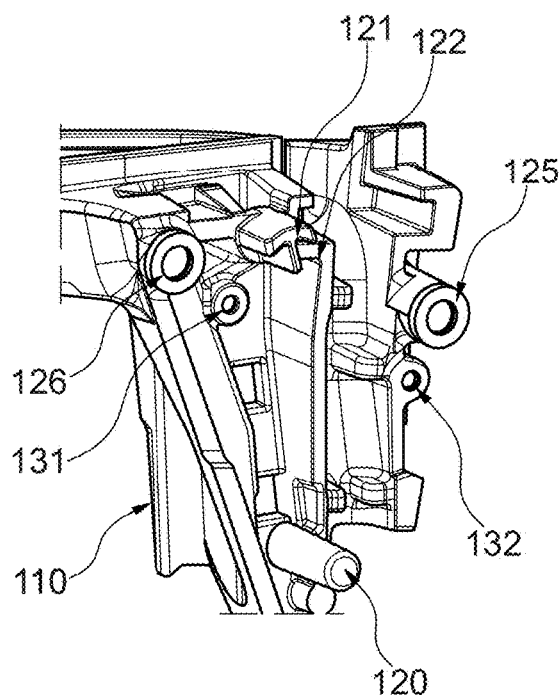
Figure 3B:
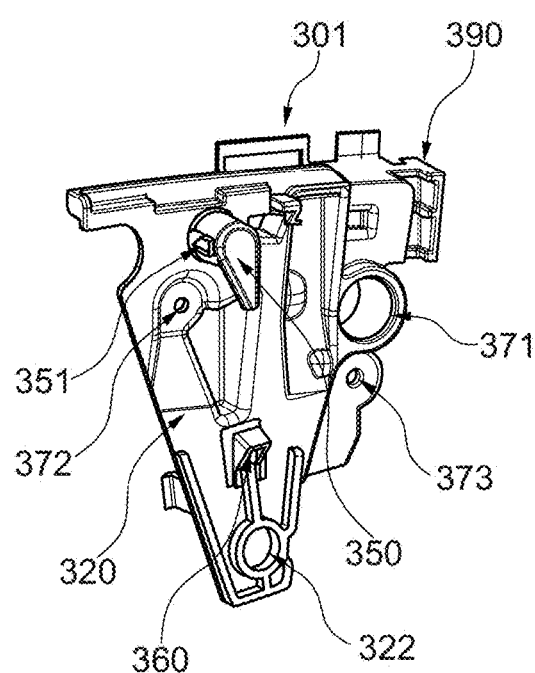
Figure 3C:
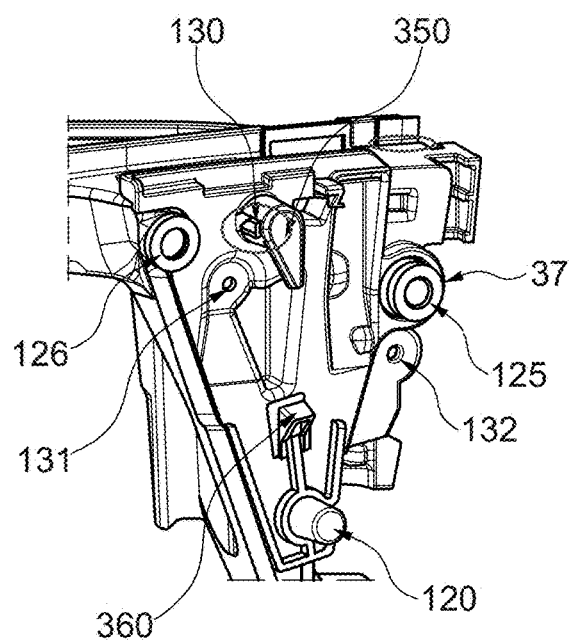

The retainer means 301, best seen in FIGS. 2b and 3b, may be manufactured from a plastic material and it provides a retainer assembly 300, together with the sealing means 800, to be arranged between the base frame 110 of the base assembly 100 of the exterior rear view device 1 and the door panel 605 of the door 600 of the vehicle 2.

The FIGS. 2a to 2e also show a harness 400 for electrically connecting in particular a power source and a control unit within the vehicle (not shown) with electric components of the exterior rear view device. Such electric components may comprise, as e.g. shown in FIGS. 4a to 4f, an actuator assembly 210 suitable for moving a head assembly 200 together with a reflective element (not shown) relative to the base frame 110 supporting the head assembly 200, and a camera 700 as well as an indicator means like a turn signal indicator 710 shown in particular in FIG. 9b. Said harness 400 may comprise a camera harness 410.

The retainer means 301 is a multi-function component. The different functions will be described with respect to the other components of the exterior rear view device 1 as well as the vehicle 2 in the following.

An important function of the retainer means 301 is harness sealing, managing harness routing and accommodating variation in the camera harness 410 and cleaning systems (not shown), as described in the following.

The door attachment portion 115 of the base frame 110 is provided with an opening 124 for a harness holder 500 at its lower, free end, as best seen in FIGS. 2d and 2e. Said harness holder 500 is formed with a fixing tie 510 for holding the harness 400 and a clip 520 for connecting the holder 500 to said door attachment portion 115 by passing through the opening 124.

The base frame harness locator opening feature governs harness position length the door side and the rear view device side, and provides a strong retention eliminating risk of the harness 400 being misplaced e.g. by being pulled through during handling. Further, the locating feature leads to reduced tolerance of fit-to-door. In other words, the harness 400 is firmly located to the base frame 110 in all directions allowing a solid datum strategy for harness lengths and provides the ability to hold as well as transport the exterior rear view device 1 whilst holding on to the harness 400.

The harness 400 as well as the camera harness 410 divided therefrom above the harness holder 500 extend between the door attachment portion 115 of the base frame 110 and a holding portion 320 of the retainer means 301 to an upper end of the door attachment portion 115, which turns into the arm 116 of the base frame 110.

The retainer means 301 is provided with guiding means for guiding the camera harness 410 to a sealing portion 310 of the retainer means 301 extending substantially perpendicularly to the holding portion 320 to cover the camera harness 410 at its bending region at the transition between the door attachment portion 115 and the arm 116, see region A in FIG. 2b.

While the base frame 110 is provided with a harness guiding channel portion 140 for guiding the harness 400 and a camera harness guiding channel portion 123 for guiding the camera harness 410, the holding portion 320 of the retainer means 301 also provides a camera harness guiding channel portion 340 to substantially close a channel 420 for the camera harness 410, as shown in FIG. 2c.

As the retainer means 301 is not metallic, the sealing of the harness 400, together with the camera harness 410, as well as the attachment of the metallic base frame 110 to the door panel 605 becomes safer. The design of the retainer means 301 allows to accommodate different sets of harness and cleaning system for all variations of mirror trim level. Further, the retainer means 301 ensures an easy assembly to seal in particular the camera harness 410 after being mounted and to manage its routing along the base frame door attachment portion 115, without departing from the commonly used datum system between the base frame 110 and the door panel 605.

Figure 3D:
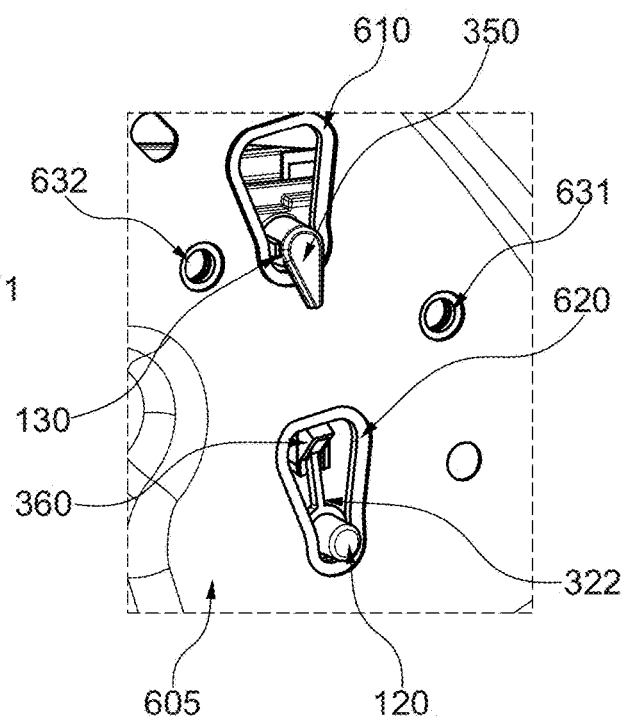
FIG. 3d is a perspective view on the retainer means and the base frame attached to a vehicle, from the side of a door panel.

The base frame 110 is provided with a location pin 120 as well as a T shaped location projection 121 belonging to the datum system ensuring a correct assembly of the components of the exterior rear view device 1 and a correct attachment of the exterior rear view device 1 to the vehicle 2. The location pin 120 and the T shaped location projection 121 extend substantially perpendicularly to the plane of the door panel 605, as can be best seen in FIGS. 3a and 3d. The retainer means 301 is provided with an opening 322 for the location pin 120 and a hook 350 with openings 351 for the arms of T shaped location projection 121, as can be best seen in FIG. 3b. FIG. 3d illustrates that the location pin 120 as well as the T shaped location projection 121 pass through the respective openings 322, 351 of the retainer means 301 to also pass respective openings 610, 620 within the door panel 605 to engage the same, with the hook 350 of the retainer means 301 ensuring the respective engagement.

The base frame T shaped location projection 121 and the location pin 120 provide the primary and secondary datum strategy to the door datum system in X+Z directions, while the Y direction is controlled by using screws. The door panel 605 in FIG. 3d shows two screw openings 631 and 632 aligned to two screw openings 131 and 132 of the base frame 110, respectively, which in turn pass openings 371 and 372 of the retainer means 301.

Thus, the corresponding locating features of the base frame 110 and the retainer means 301 allow the base frame datum features to interface with the door 600 minimizing tolerance of datum strategy.

Further location projections 125 and 126 are provided by the door attachment portion 115.

The retainer means 301 along with the location pin 120 and the T shaped location projection 121 not only provides an accurate assembly to the door panel datum system, but also facilitates the assembly as it provides a robust 3rd hand clip/hanger function.

The retainer means 301 provides a first clip 315, which serves the attachment to the base frame 110 as best seen in FIGS. 2a and 2b. The hook 350 primarily serves to hold the exterior rear view device 1 in Y direction to assist assembly of the screws (not shown), while the second clip 360 is on secondary location keyway to highlight when the exterior rear view device 1 is in its final assembly Z position, as best seen in FIG. 3d.

Next, the assembly of the base frame 110 and the retainer means 301 with a case lower or lower case 220 of the head assembly 200 of the exterior rear view device 1 and the sealing means 800 is described with reference to FIGS. 4a to 4f.

The slim design of the base frame 110 allows the lower case 220 of the head assembly 200 to be assembled over the door attachment portion 115 and the arm 116 of the base frame 110 to reach the region of the head assembly 200 with the actuator assembly 210, as shown in FIGS. 4a to 4d. In this respect it is to be noted that it is critical to assemble high gloss components like the lower case 220 late in the assembly sequence to minimize risk of damage. For that purpose the lower case 220 is provided with an opening 222, preferably being substantially circular, through which the base frame 110 together with the retainer means 301 can pass.

Figure 4A:
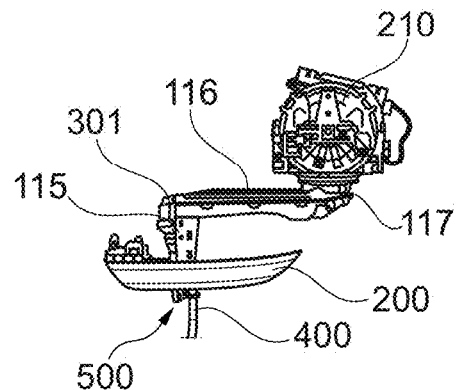
FIGS. 4a to 4f are perspective views demonstrating the assembly of the base frame with the retainer means firstly to a lower case of a head assembly of an exterior rear view device of the present disclosure and secondly to the sealing means of FIG. 1c.
Figure 4B:
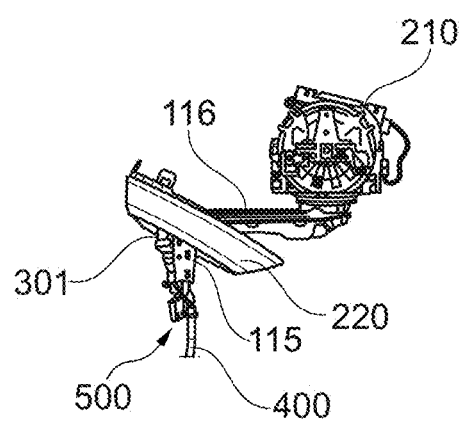
Figure 4C:
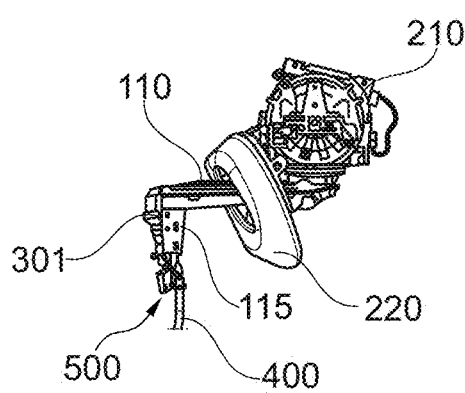
Figure 4D:
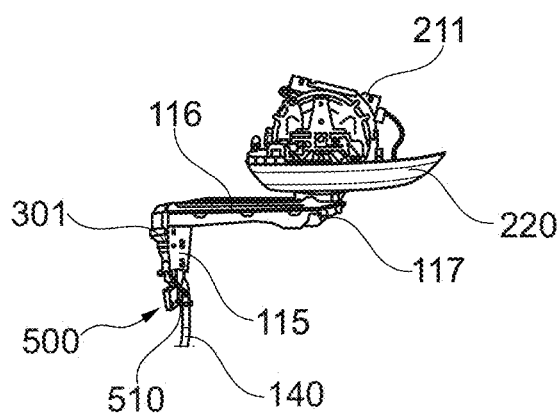
Figure 4E:
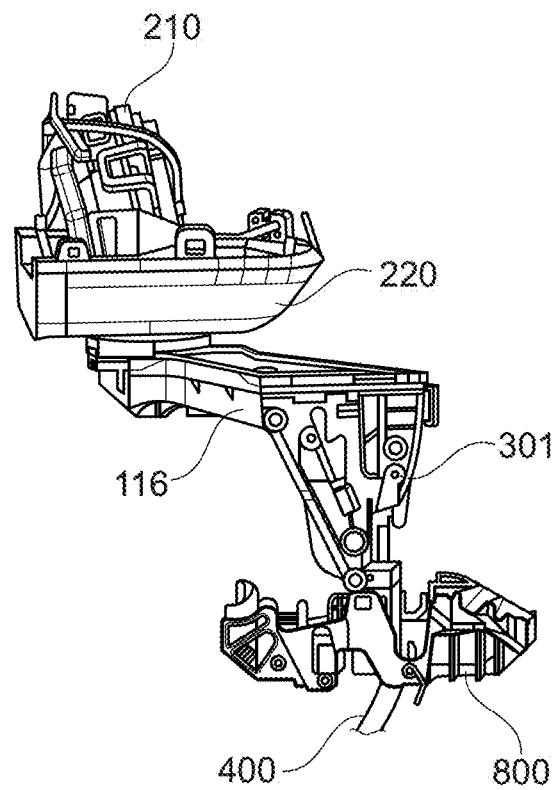
Figure 4F:
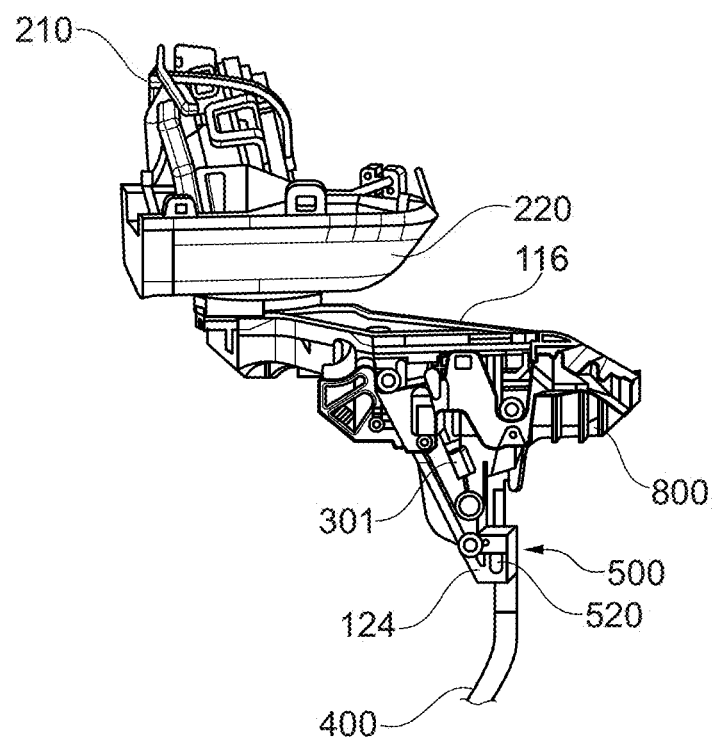

The sealing means 800 is mounted after the lower case 220, as shown in FIGS. 4e and 4f. The sealing means location strategy is critical as it dictates the datum strategy for the corresponding base cover components.

As already mentioned above, the smaller base frame geometry and the provision of a separate 2K door gasket provided by the sealing means 800 permit the lower case 220 to be assembled over the base frame 110. In the following the attachment of the sealing means 800 to the base frame 110 with the retainer means 301 is described with reference to FIGS. 5a to 5c.

Clips 810, 830 and 840 as well as clip opening 820 allow to attach the sealing means 800 to the base frame 110 which is provided with complementary steps 135 and 136 and openings 137 and 138. The base frame 110 also is provided with location projections 125 to 127, with two location projections 125 and 125 extending through the retainer means 301 as well as the sealing means 800 attached on top of the retainer means 301, see FIG. 5a.

Figure 5A:
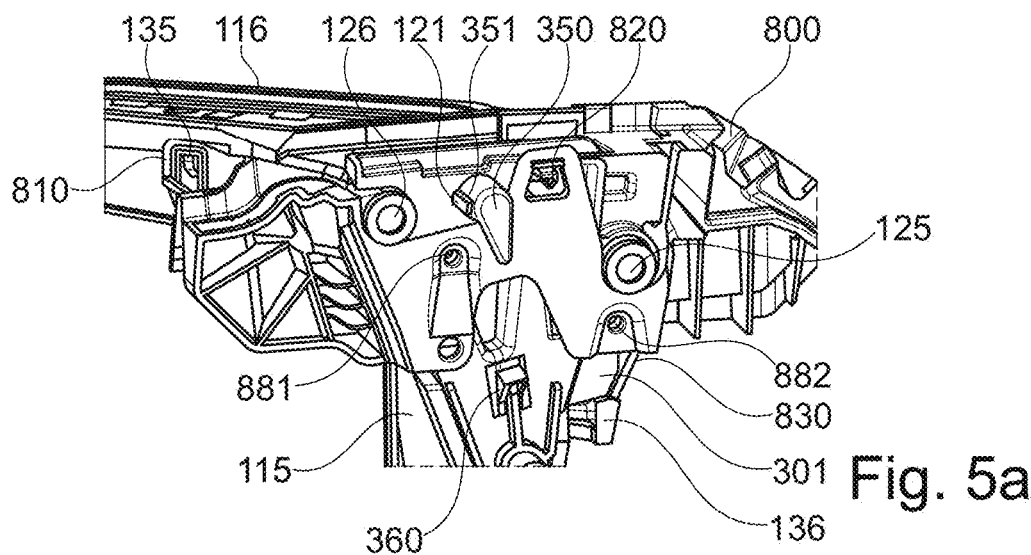
FIGS. 5a to 5c are perspective views demonstrating attachment features of the sealing means of FIG. 1c.
Figure 5B:
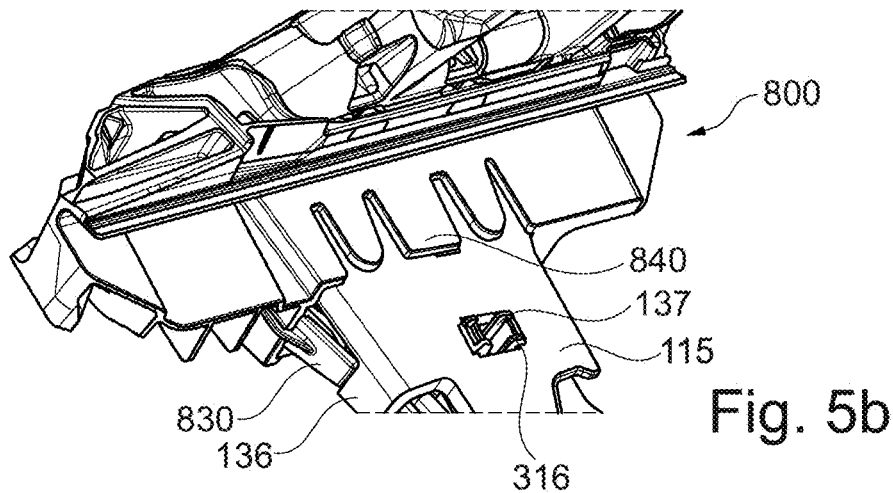

FIG. 5b also shows a clip 316 of the retainer means 301 engaging a respective opening 137 provided by the base frame 110.

Figure 5C:
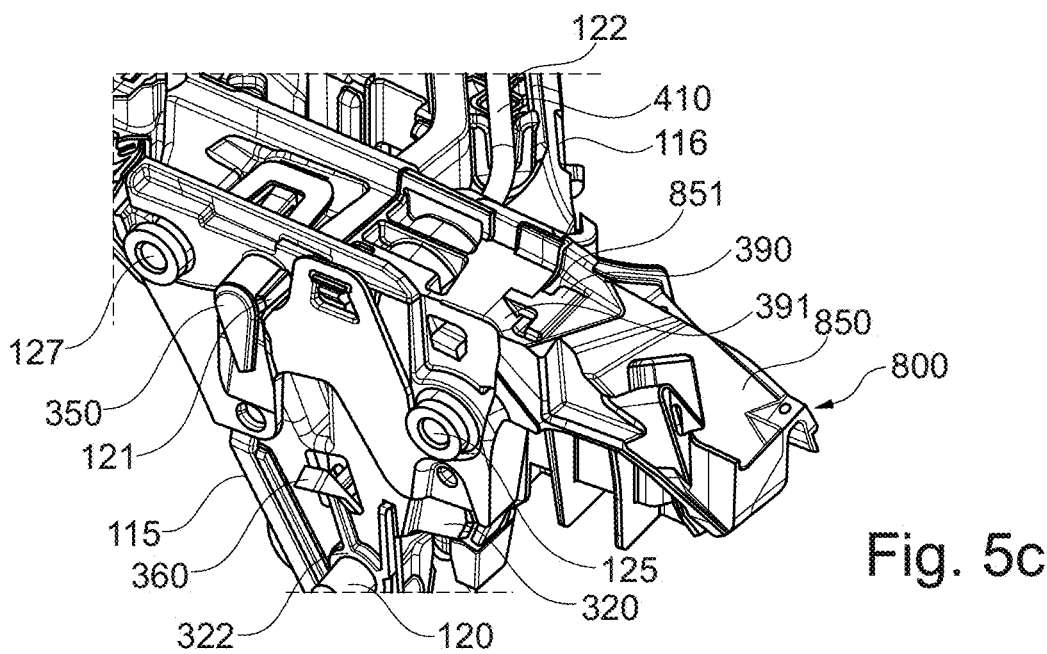
Figure 13A:
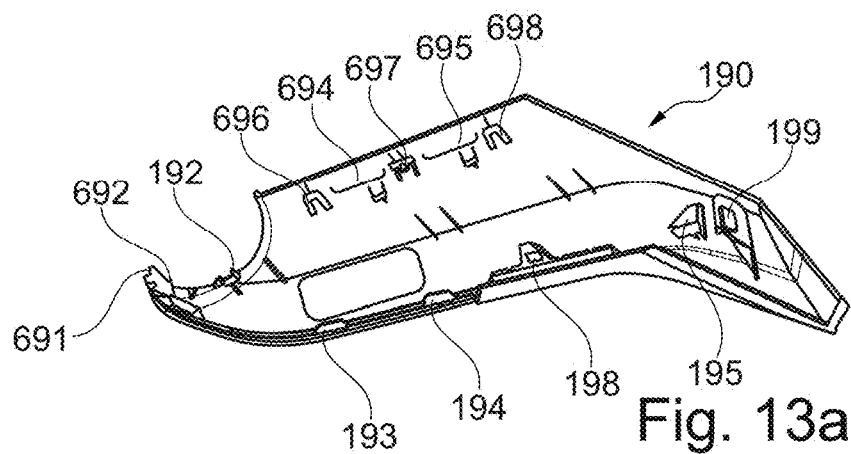
FIG. 13a is a perspective view of the upper base cover of FIG. 12e.
Figure 13B:
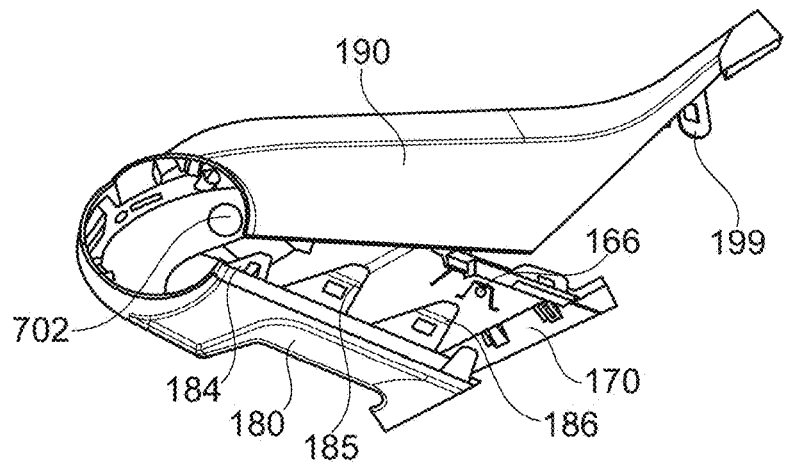
FIGS. 13b to 13i are perspective views demonstrating the attachment of the upper base cover of FIG. 13a with the lower base cover of FIG. 1a as well as the base cover cap of FIGS. 10a and 10b.
Figure 13C:
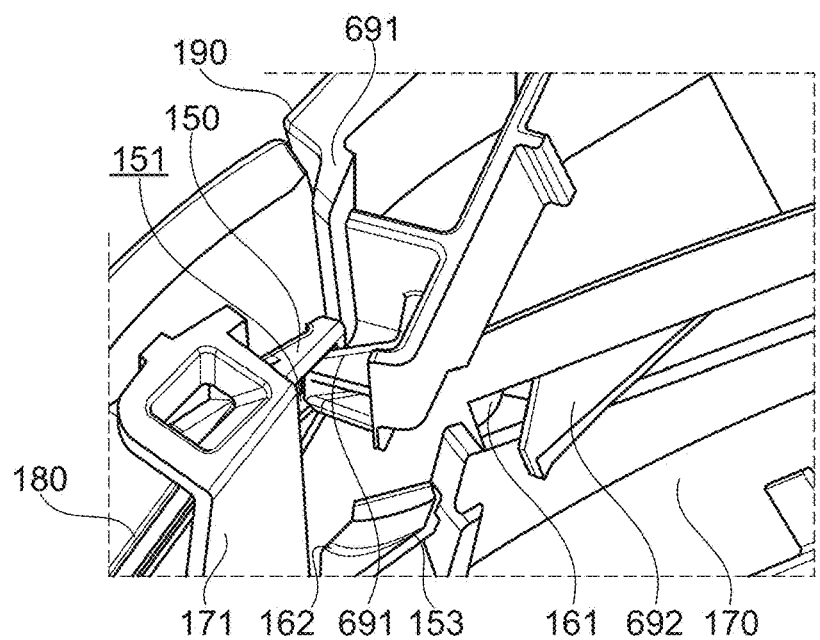
Figure 13D:
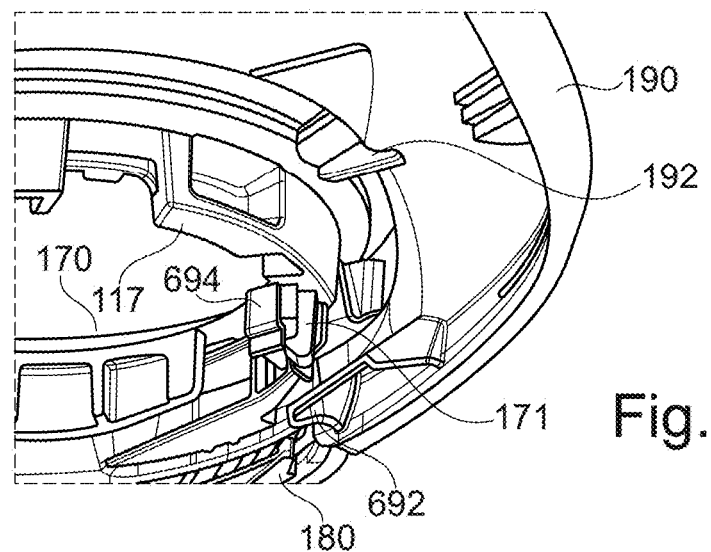
Figure 13E:
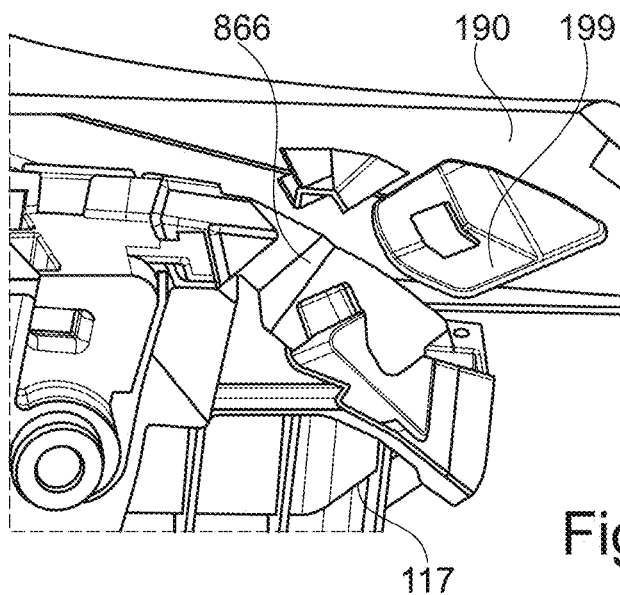
Figure 13F:
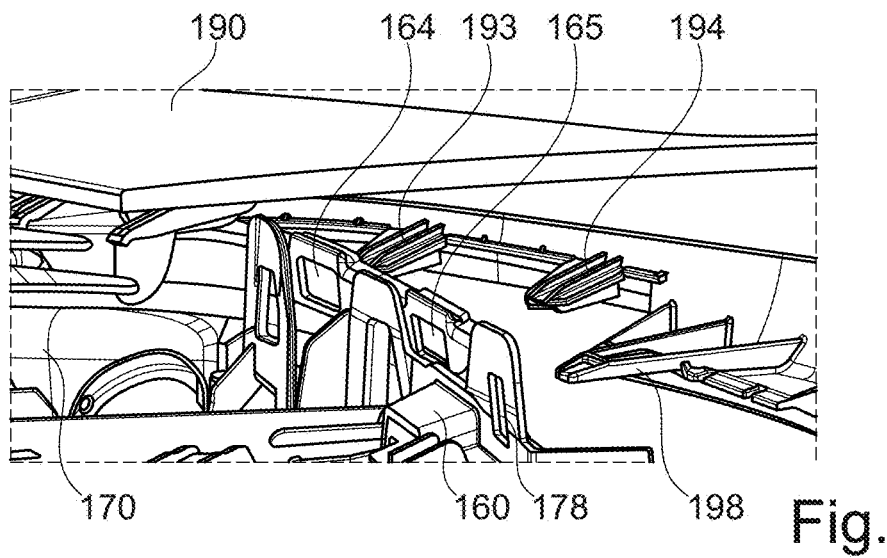
Figure 13G:
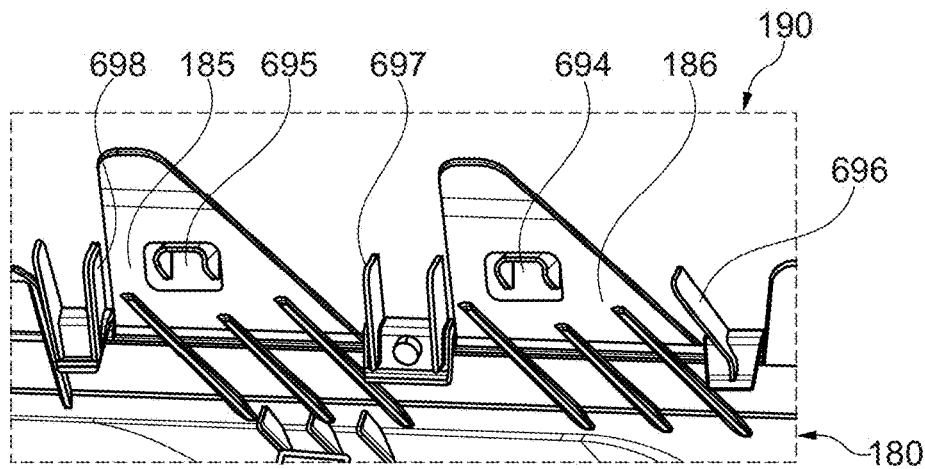
Figure 13H:
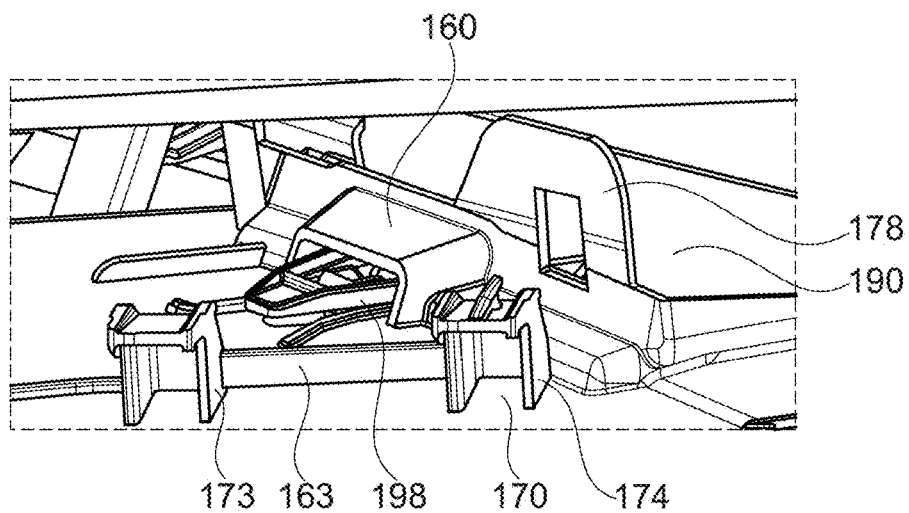
Figure 13I:
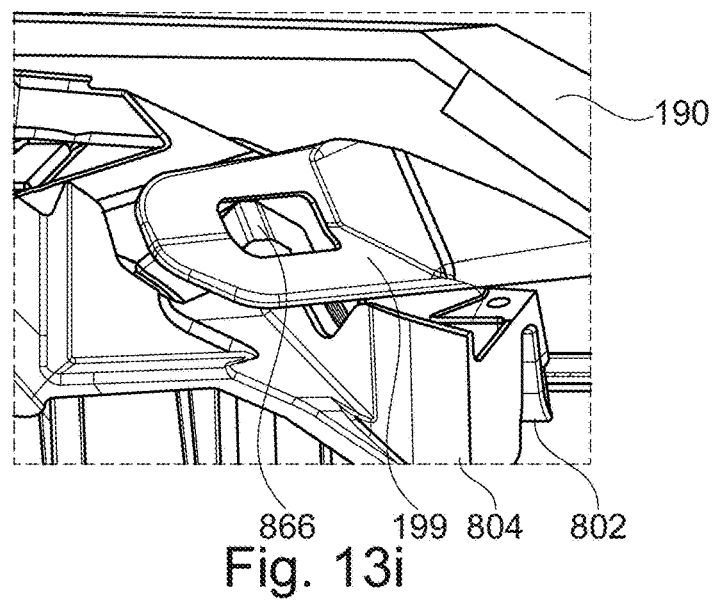

The sealing means 800 provides a datum area 850 for an upper base cover 190 as described with respect to FIG. 13i, with T-slots 391, 851 built into both the retainer means 301 and the sealing means 800, see FIG. 5c, to maximize and gain strength from the base frame into the area for upper base cover assembly.

Two screw positions determined by two screw openings 881 and 882 in the sealing means 800, best seen in FIG. 5a, and the two screw openings 131 and 132 of the base frame 110 shown in FIG. 3a, allow to secure the sealing means 800 together with the retainer means 301 to the base frame 110. These are package protections only if more strength is required.

Figure 6C:
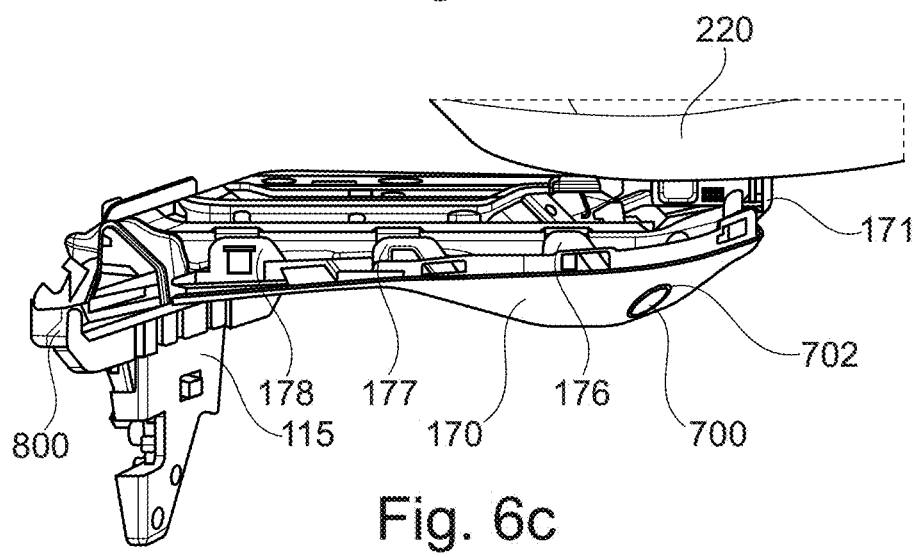

The assembly process of the lower base cover 170 to the sub-assembly of FIG. 4f is designed in such a way that the camera hole 702 in the lower base cover 170 avoids scratching or fowling the camera lens whilst rotating into final assembled condition, by first approaching the the lower base cover 170 to the base frame 110 (FIG. 6a), then attaching the lower base cover 170 to the base frame 110 at the door attachments portion 115 (FIG. 6b), and finally rotating the lower base cover 170 on the arm 116 (FIG. 6c).

Figure 6D:
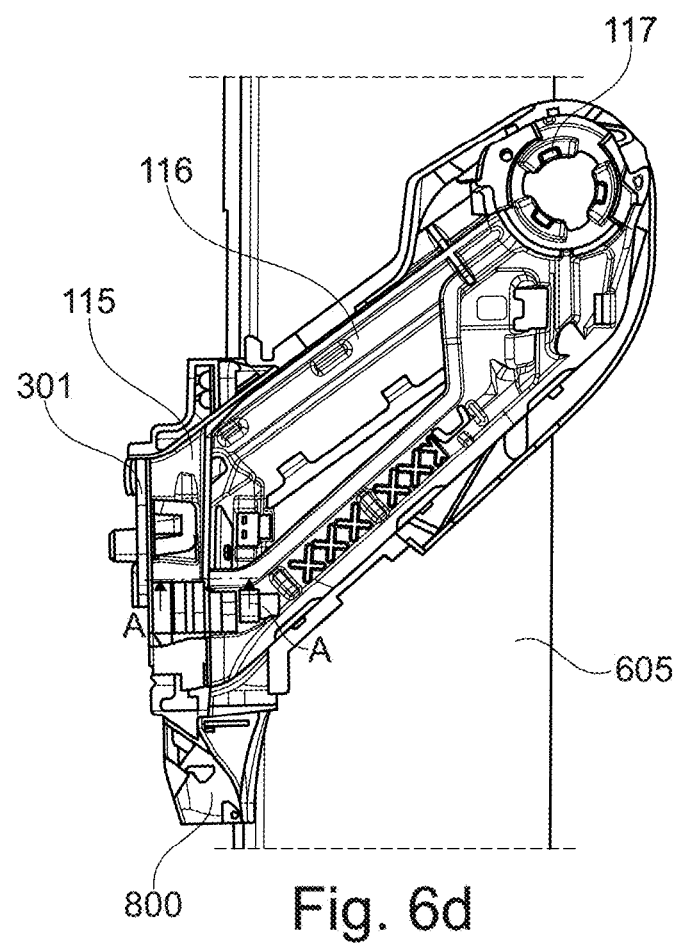
FIG. 6d is another view of the sub-assembly of FIG. 6c, attached to the door.
Figure 6E:
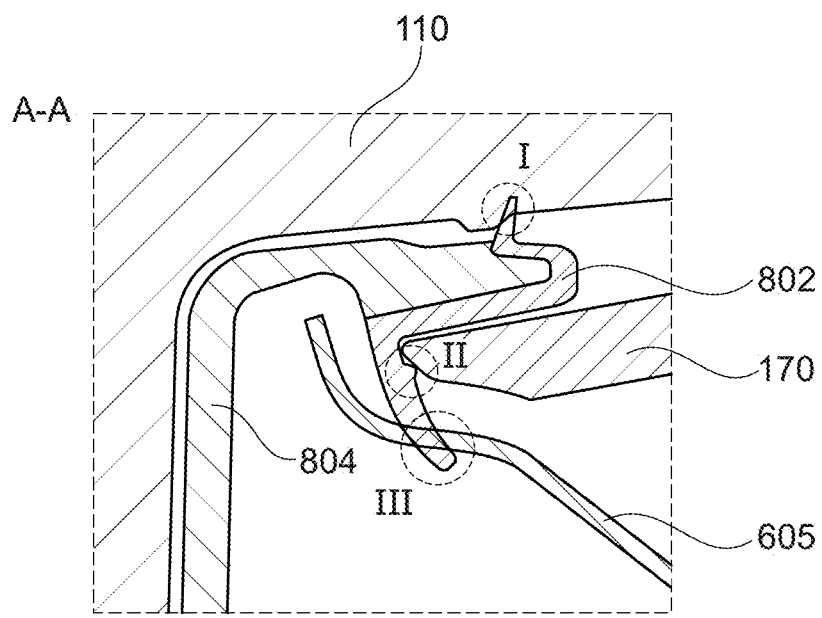
FIG. 6e is a cross-section taken along the line A-A of FIG. 6d.

The sub-assembly of the base frame 110, the retainer means 301, the sealing means 800 and the lower base cover 170 is shown in FIG. 6d, attached to the door panel 605. FIG. 6e shows a cross-section taken along the line A-A in FIG. 6d. From FIG. 6e the functions of the sealing means 800 as a 2K door gasket, including an integrated 2-way simultaneous sealing function as well as providing datum, location and positional controls for matching the lower base cover 170, can be best seen.

In detail, the 2-way simultaneous sealing is achieved due to the more or less S shape cross-sectional geometry of the door gasket seal 802, which may be a rubber part formed together with the door gasket substrate 802, to allow sealing in three areas with only one cavity in a 2K tool. The three sealing areas are marked with I, II and III in FIG. 6*d*:

sealing area I provides an inner sealing to the base frame 110, sealing area II provides an outer sealing to the lower base cover 170, and sealing area III provides an outer sealing to the door panel 605.

Figure 7A:
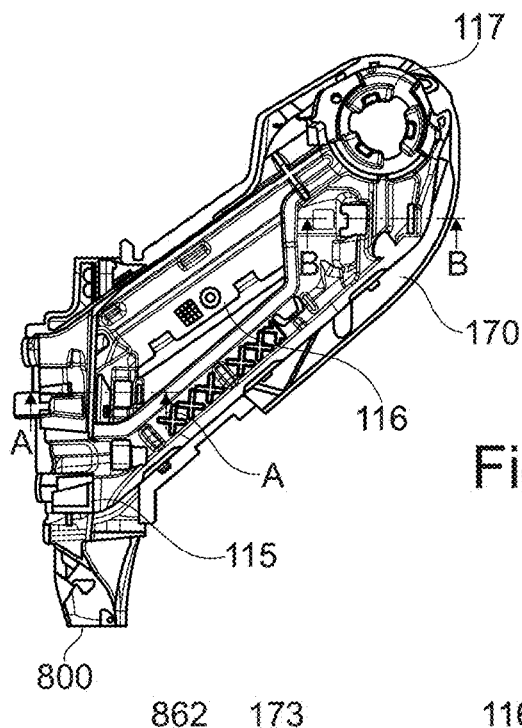
FIG. 7a is a top view on the sub-assembly of FIG. 6c.
Figure 7B:
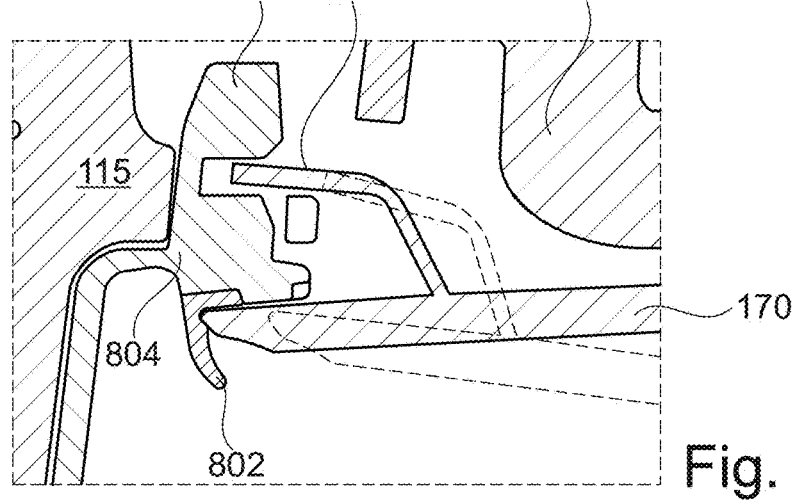
FIG. 7b is a cross-section of the sub-assembly of FIG. 7a taken along the line A-A.
Figure 7C:
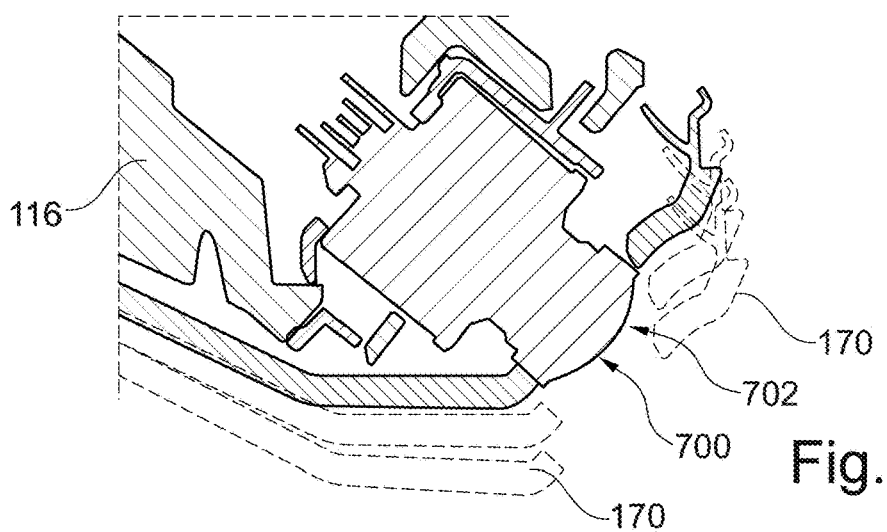
FIG. 7c is a cross-section of the sub-assembly of FIG. 7a taken along the line B-B.

The sealing means geometry between the exterior rear view device 1 and vehicle door 600 provides a tolerant and accurate sealing strategy when considering the assembly direction. The tolerance between door panel 605 and door datum system may be large as sealing lip of the door gasket seal 802 of the sealing means 800 accommodates for such variations The sub-assembly shown in FIG. 6*d* is also shown in FIG. 7*a*, whereas FIGS. 7*b* and 7*c* show details of the rotational attachment of the lower base cover 170, referred to above with respect to FIGS. 6*a* to 6*c*:

At the beginning, at the door attachments portion 115 in FIG. 7*b*, the edge of the lower base cover 170 engages the door gasket seal 802 such that the hook 173 can rotate into the hook pocket 862 provided by the door gasket substrate 804, and at the end, at the head attachments portion 117 in FIG. 7*c*, the camera hole 702 is embracing the camera 700.

The rotational attachment of the lower base cover 170 ensures that the camera, in particular its lens, remains untouched by the lower base cover 170.

FIGS. 8*a* to 8*c* illustrate a camera cradle 704 for assembling in the base frame 110 for holding the camera 700 securely within the base assembly 100 of the exterior rear view device 1. Thus, the camera 700 is installed in the base frame 110 using the camera cradle 704, as shown in FIG. 8*a*. The camera cradle 704 is symmetrical along at least one axis and no screws are needed to attach the camera cradle 704 to the base frame 110. Further the body of the camera 700 is protected from contacting the metallic base frame 110 as the camera cradle 740 is made out of a plastic material in order to isolate the camera housing. The camera cradle 704 as shown in FIG. 8*c* is a one-piece element which is preferably formed by a molding process.

The camera cradle 704 include one or more location ribs 742 inside the interior surface of the cradle 704 which hold the camera 700 securely in place to provide an accurate and tuneable positioning of the camera along the X, Y, and Z axes. In the example shown in FIG. 8*c*, the location ribs 742 include six ribs formed as two pairs of ribs on three interior walls of the camera cradle 704; however, any number of ribs 742 may be used.

It can be seen in FIGS. 8*b* and 8*c* that the camera cradle 704 also includes one or more anti-backout projections 746 and one or more clips 744. The anti-backout projections 746 are frictionally fit into the walls of the base frame 110 when the cradle 740 is inserted. When the walls of the base frame 110 push against the projections 746 and the cradle 704 is inserted, this also "locks" the clips 744 to tighten the attachment of the camera 700 to the camera cradle 704.

In the shown example, there are two anti-backout projections 746 and two clips 744 which are formed closer to a bottom edge of the cradle 704, i.e. the edge of the cradle 704 closer to the camera lens. However, any number of anti-backout projections 746 and clips 744 may be used in a variety of different positions. This ensures a tight lock of the camera 700 and stops the camera body from contacting the base frame 110.

The sub-assembly of FIG. 6*c* is also shown in FIG. 9*a*, but mounted to the vehicle 2 and with the completed head assembly 200 attached, as well as from another perspective. FIG. 9*a* shows further details of the vehicle 2 in the region of the door 600, namely a cheater panel 640 as well as a window 1000, with a glass run seal 920 as well as a wait finisher 940. In FIG. 9*b* the final rear view device 1 attached to the vehicle 2 can be seen. Accordingly, the exterior rear view device 1 holds the glass run seal 920 in a solid position and, thereby, provides a very pleasing overall appearance suggesting that the exterior rear view device 1 extends or rather grows out of the wait finisher 940 covering a part of the glass run seal 920.

Figure 10A:
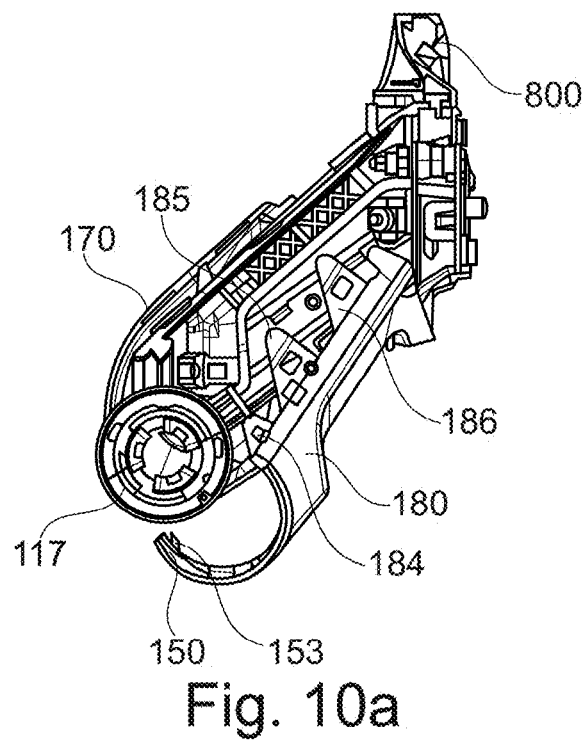
Figure 10B:
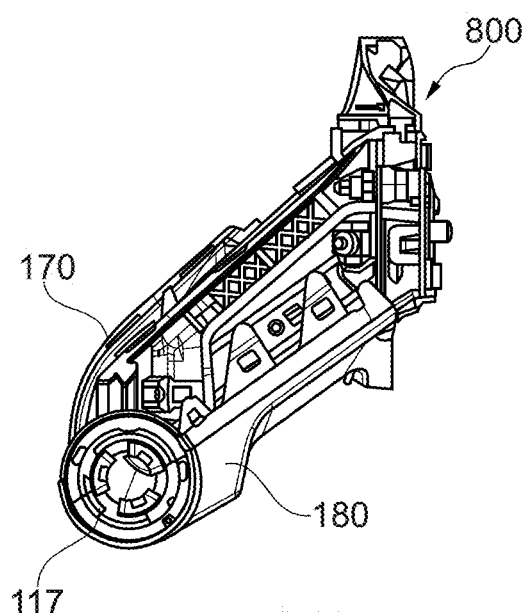

In the following it is described how to finalize the exterior rear view device 1. Next, starting from the sub-assembly of FIG. 7*a*, the assembly of a base cover cap 180, being another one of the three cover pieces of the base frame 110 and being formed with projections 150, 153 and clips 184, 185 and 186 is described with respect to FIGS. 10*a* and 10*b*. Said assembly process of the base cover cap 180 is designed in such a way that the base cover cap 180 slides in along a ramp on the lower base cover 170 to lock in behind the base cover cap 180 creating a rotation point to rotate the base cover cap 180 into its final position.

Said sliding will be discussed in further detail with respect to FIGS. 14*a* to 14*c*. But next, in order to better understand the assembly of the base cover cap 180 as part of the base cover, FIGS. 11*a* to 11*e* illustrate its attachment step by step, by starting in FIG. 11*a* with a part view of the sub-assembly of FIG. 7*a* attached to the door panel in order to be arranged next to the glass run seal 920, and showing attachment features of the base cover cap 180 in FIG. 11*b*. Accordingly, the base cover cap 180 is provided with a tab 152 in addition to the clips 184 to 186.

Figure 11A:
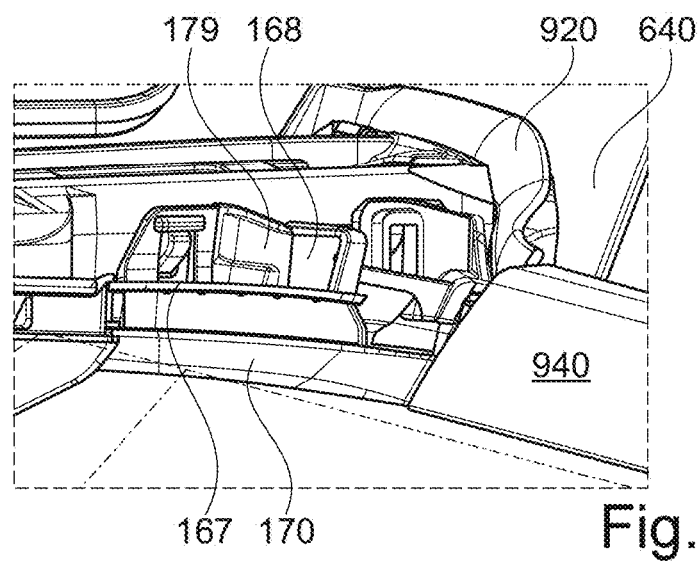
FIGS. 11a to 11e are perspective part views of the lower base cover of FIG. 1a, the base cover cap shown in FIGS. 10a and 10b and an upper base cover, demonstrating the attachment of those 3 cover pieces to each other.
Figure 11B:
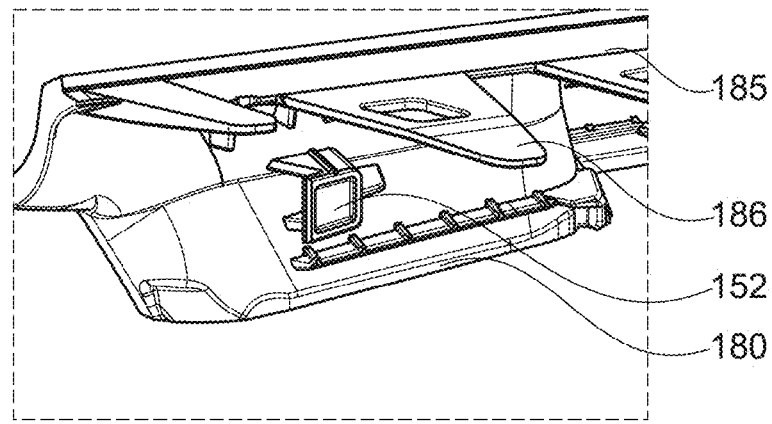
Figure 11C:
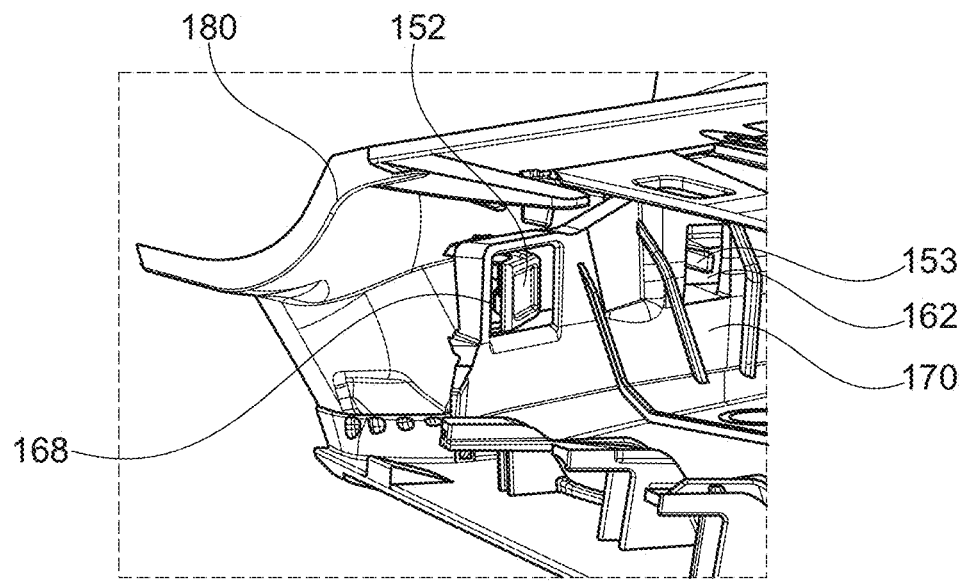

The tab 152 of the base cover cap 180 is to be entered into an opening 168 of the lower base cover 170 provided on one side of the clip 179, shown in FIG. 1*a*. Said tab 152 defines the attachment direction and locks in behind the lower base cover 170, as illustrated in FIG. 11*c*, for creating said rotation point.

Figure 11D:
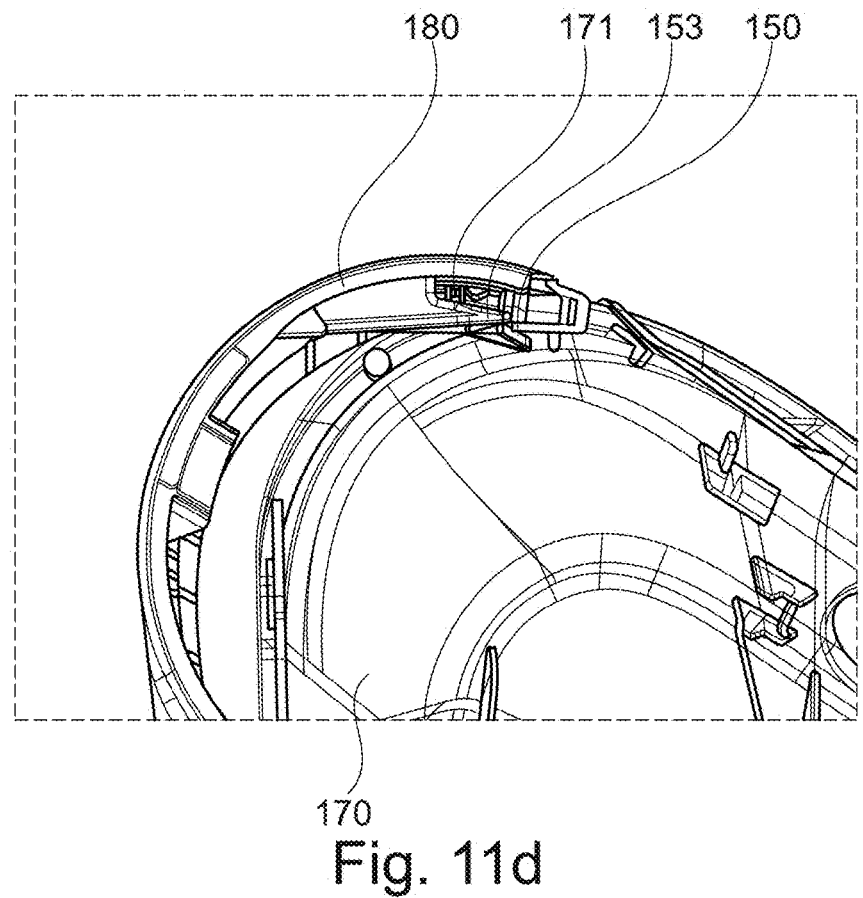

The next step is to rotate the base cover cap 180 into final position. The rotation has been created such that no surrounding parts are scratched, by the outboard area of the base cover cap 180 being forced to flex outboard while rotating, as indicated in FIG. 11*d*.

Figure 11E:
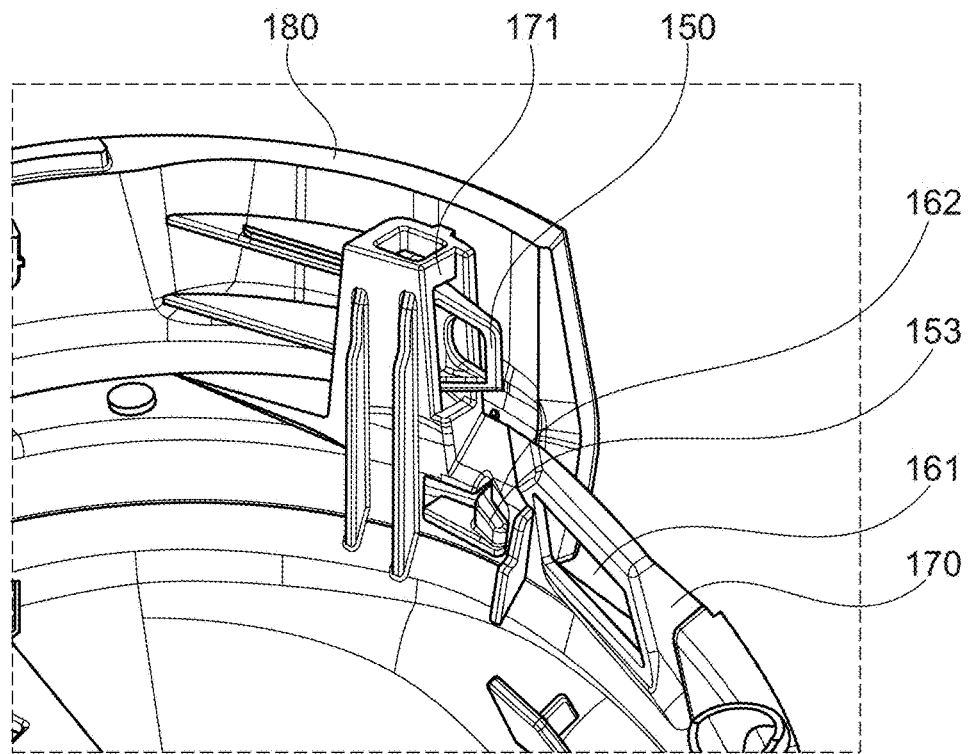

FIG. 11*e* shows the peg type projection 150 of the base cover cap 180 entering into a slot in the multi-functional assembly projection 171 of the lower base cover 170, while the other peg type projection 153 of the base cover cap 180 enters into another slot in the multi-functional assembly projection 171 of the lower base cover 170 as well as flexing back into the opening 161 of the lower base cover 170 for controlling the final fit of the base cover cap 180.

Figure 12A:
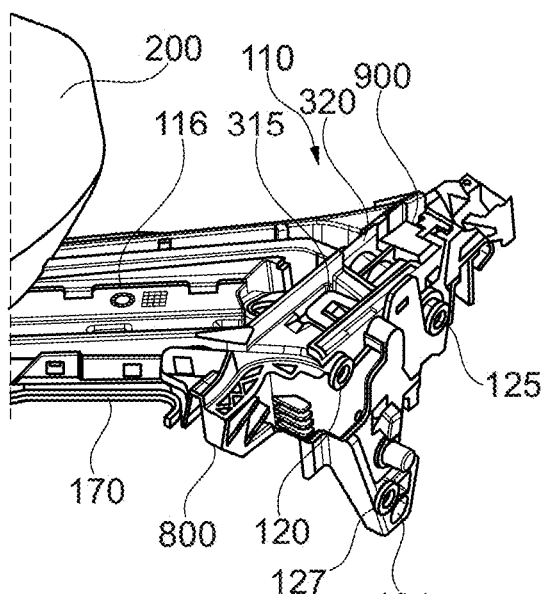
FIGS. 12a to 12f are perspective views demonstrating the assembly of a glass run seal, a cheater panel, the base frame, an base cap and the upper base cover with respect to the door panel and a window.
Figure 12B:
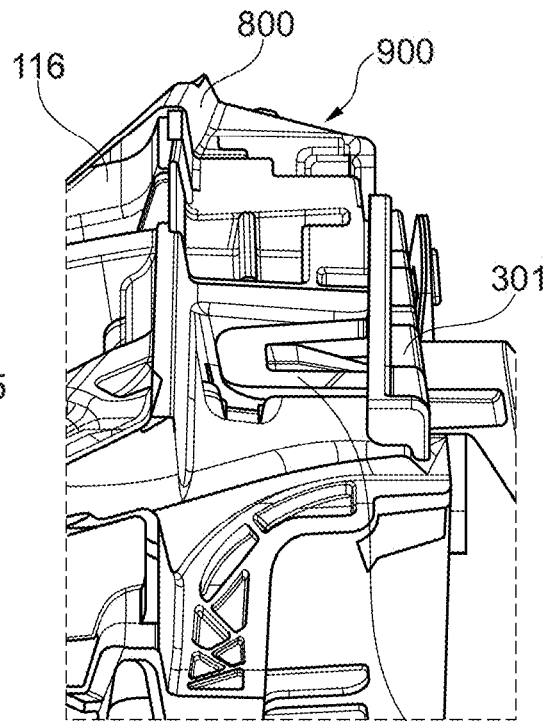
Figure 12C:
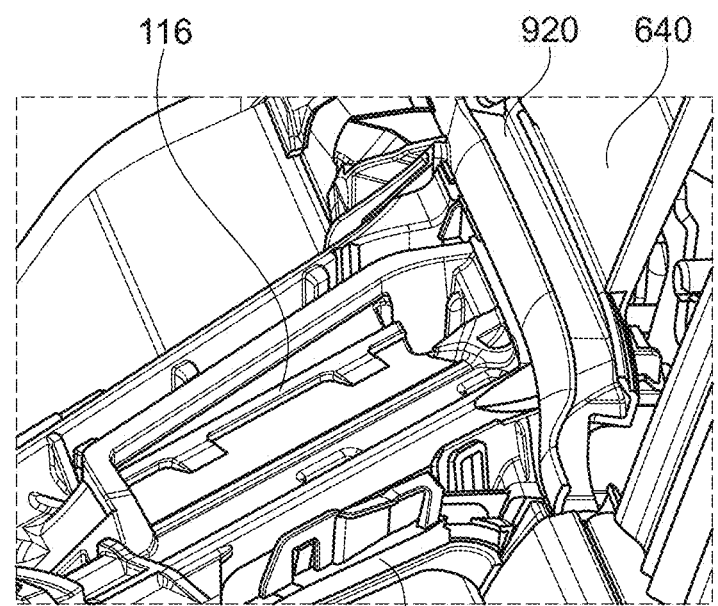

The sub-assembly of the base frame 110, the retainer means 301 and the sealing means 800 shown in FIG. 7*a* also forms a channel 900, see FIGS. 12*a* and 12*b*, for positioning as well as locating the glass run seal 920 in particular allocated to the cheater panel 640 as shown e.g. in FIG. 12*c*.

In the following the attachment of the base cover cap 180 and the base cover upper or upper base cover 190 are described with reference to FIGS. 12*d* to 12*f*.

The combination the base frame 110, the retainer means 301 and the sealing means 800 forms the channel 900 which locates the glass run seal 920 on to the exterior rear view device 1. The glass run seal 920 runs along the cheater panel 640 and is an extension of the glass run seal running along the window 1000 and being covered by the wait finisher 940 as shown in FIGS. 9b, 12c and 12d.

Figure 12D:
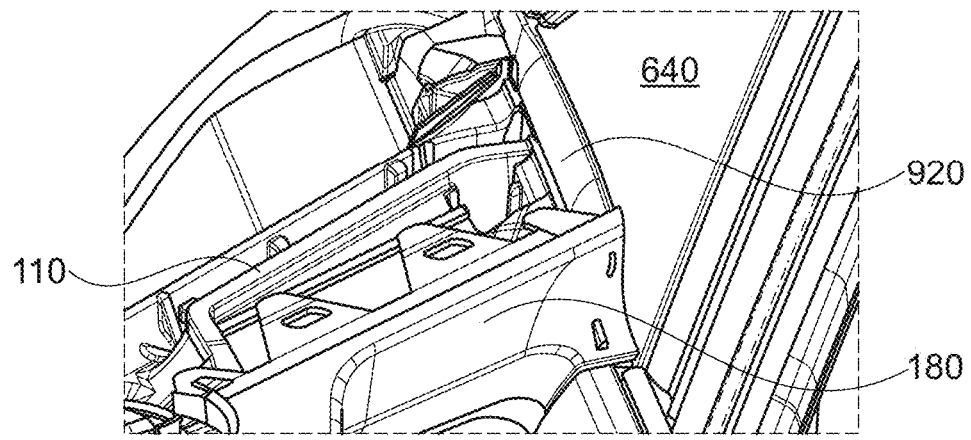
Figure 12E:
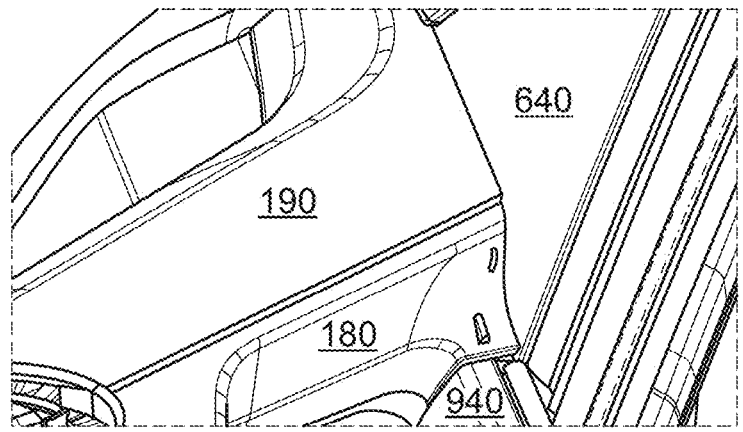
Figure 12F:
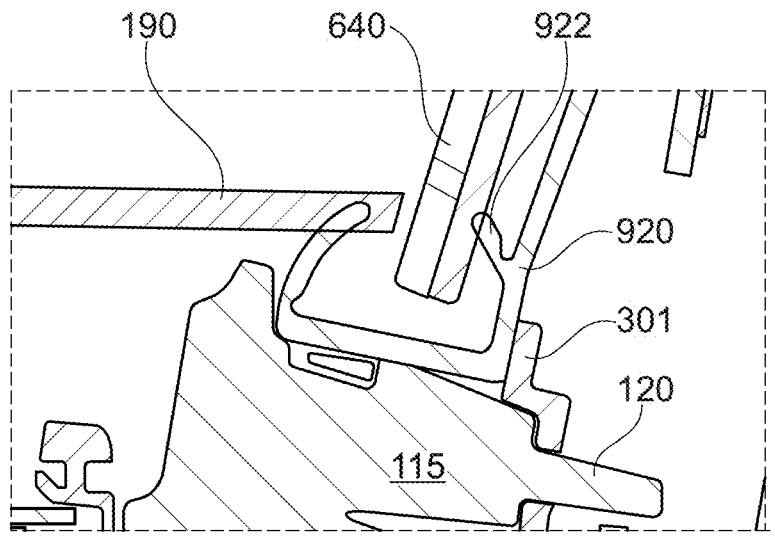

The base cover cap 180 clips to the base frame 110, see FIG. 12d, and also the upper base cover 190, providing the last and third cover piece of the base frame 110, is attached by clip connection, see FIG. 12e. The clip connection may be located behind a chrome wait finisher (not shown) and will be described below with respect to FIGS. 13a to 13i.

The cheater panel 640 pushes the glass run seal 920 into the correct position inside the channel 900 while being assembled. The base cover 180 and the upper base cover 190 assemble in such a way that when rotating into their position a sealing lip 922 of the glass run seal 920 is pushed against the cheater panel 640 sealing the gap between the base cover cap 180 and the upper base cover 190 on the one side and the cheater panel 640 on the other side, see FIG. 12f.

FIGS. 13a to 13i illustrate details of the attachment of the upper base cover 190 with the lower base cover 170 and the base cover cap 180 to assemble the cover of the base frame 110. For that purpose, FIG. 13a shows the different attachment features of the upper base cover 190 with four location projections 192 to 195, a clip 198, a hoop clip 199, two location pegs 691, 692, two clip retention extensions 694 and 695 as well as three aligns projections 696 to 698.

To assemble the upper base cover 190, the two location pegs 691 and 692 need to be fitted into two corresponding slots, one being provided by the opening 162 in lower base cover 170 and the other by a slot 151 being formed in the projection 150 of the base cover cap 180, see FIG. 13c. The peg 691 pulls the base cover cap 180 into the final position and defines the rotation axis for the components. Rotating the components results in engagement of the four location projections 192 to 194 and 198 to position the upper base cover 190, see FIGS. 13d to 13f.

Three alignment features are provided by the upper base cover 190 in form of the projections 696 to 698 to align and lead two clip retention features in form of the clip retention extensions 694 and 695 onto the corresponding clips 185 and 186 of the base cover cap 180, see FIG. 13g.

The bottom clip 198 of the upper base cover 190 goes into the pocket 160 in the lower base cover 170 and locates the bottom parts of the components 190 and 170, as shown in FIG. 13h.

The last cover engagement feature is the hoop clip 199 of the upper base cover 190 which is shown in FIG. 13i and secures the whole assembly by engaging the projection 866 of the door gasket substrate 804.

Accordingly, the sealing means 800 plays a central role due to in particular
- including integrated two way simultaneous sealing function with three sealing areas, i.e. the sealing area I providing an inner sealing to the base frame 110, the sealing area II providing an outer sealing to the lower base cover 170, and the sealing area II providing an outer sealing to the door panel 605;
- having a geometry which permits the case lower 220 of the head assembly 200 to be assembled over the base frame 110,
- providing a datum area 850 with a T section support structure for the upper base cover 190 permitting simple clip together assembly,
- allowing a locking system, no screw assembly, of the lower base cover 170 rotating over the camera 700, and
- providing the channel 900 for the glass run seal 920 together with the base frame 110 and the retainer means 301, with said channel 900 allowing to position and locate the glass run seal 920, such that the exterior rear view device 1 holds the glass run seal 920 in a solid position and, thereby, provides a very pleasing overall appearance suggesting that the exterior rear view device 1 extends or rather grows out of the wait finisher 940 covering part of the glass run seal 920.

Figure 14A:
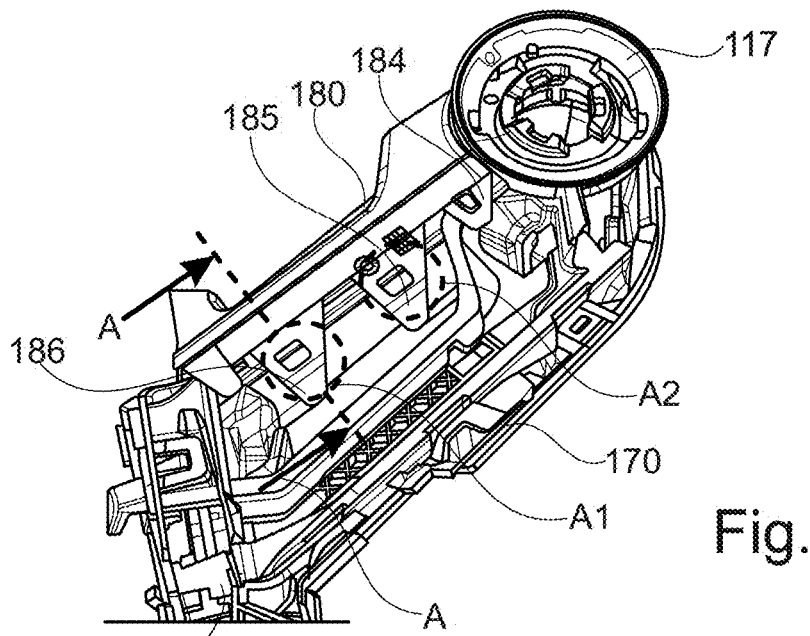
FIG. 14a is a perspective view of the base assembly, without the upper base cover.
Figure 14B:
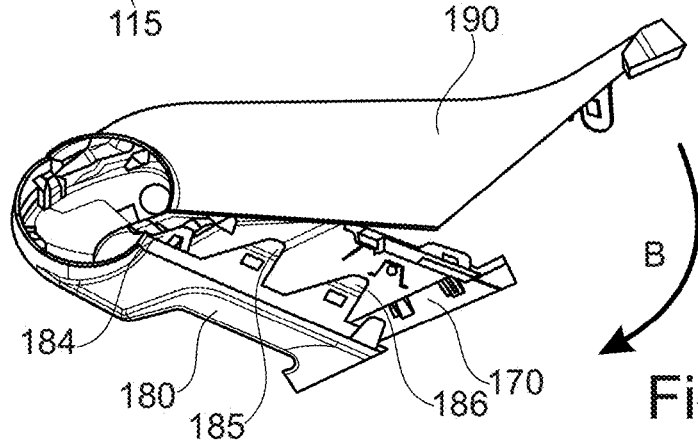
FIG. 14b is a perspective view demonstrating the attachment of the upper base cover, without the base frame.
Figure 14C:
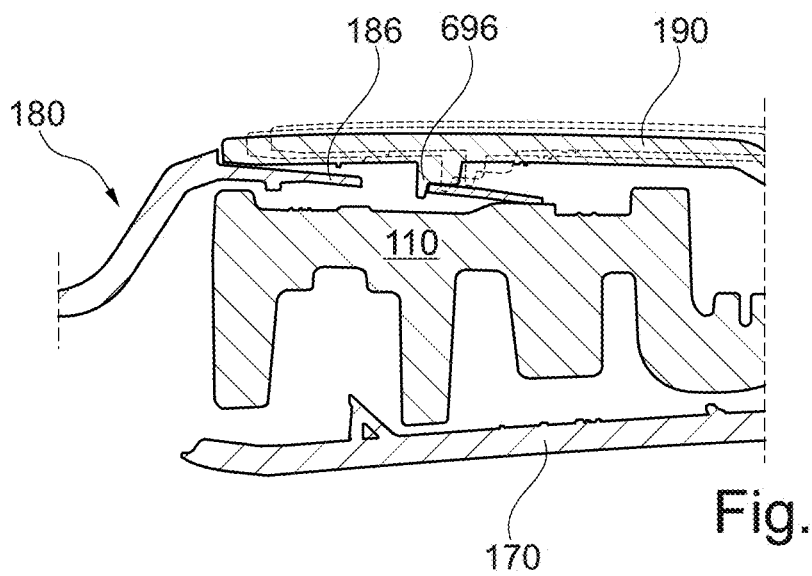
FIG. 14c is a cross-sectional view along the line A-A of FIG. 14a, with attached upper base cover.

FIGS. 14a to 14c demonstrate the attachment of the upper base cover 190 assisted by the base cover cap 180 while being assembled to the base frame 110 by providing a ramp guiding the rotational movement of the upper base cover 190. The ramp is provided by the two clips 185 and 186 the base cover cap 180 which also fulfill location and clips functions, simultaneously. Said clips 185 and 186 are arranged closer to the door attachment portion 115 of the base frame 110 than the third clip 184. The two integrated leaf spring features provided by the clips 185 and 186, acting on the base frame 110, align and pre load the cover assembly.

As best seen in FIG. 14c, the base cover cap leaf spring clips 185 and 186 rest on the base frame 110 at the root and end of each clip 185 and 186, allowing the middle portion of each clip 185 and 186 to flex downwards. Such a downward flex of the leaf spring clips 185 and 186 allows the upper base cover 190 to assemble and clip into position by rotating in the direction of the arrow B in FIG. 14b. The leaf spring interface with the upper base cover 190 allows pre load and tolerant fit of the three cover pieces 170, 180 and 190.

With respect to the FIGS. 15a to 17c the realization of the camera service requirement is described.

Figure 15A:
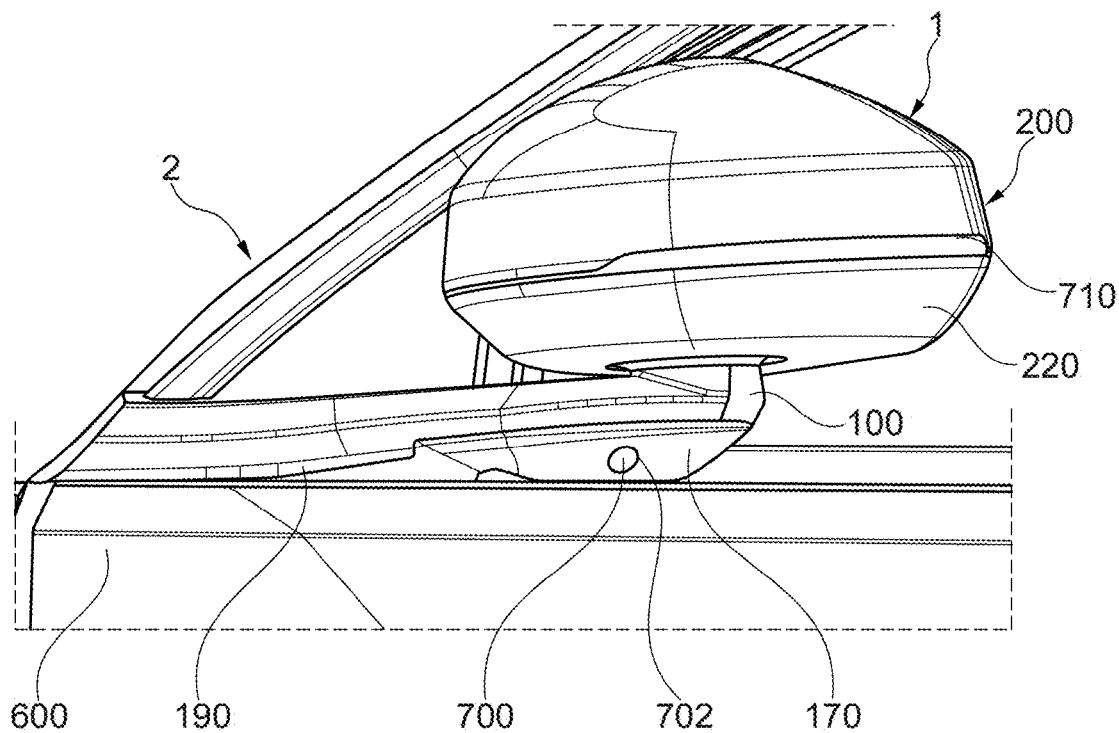
FIGS. 15a to 15f are perspective views demonstrating the dis-assembly of the 3 cover pieces for the camera repair.

In FIGS. 15a the assembled exterior rear view device 1 mounted to the vehicle 2 is shown. To access the camera 700, all the three cover pieces are easily removable while the exterior rear view device 1 remains mounted to the door 600, see FIGS. 15b to 15f.

Figure 15B:
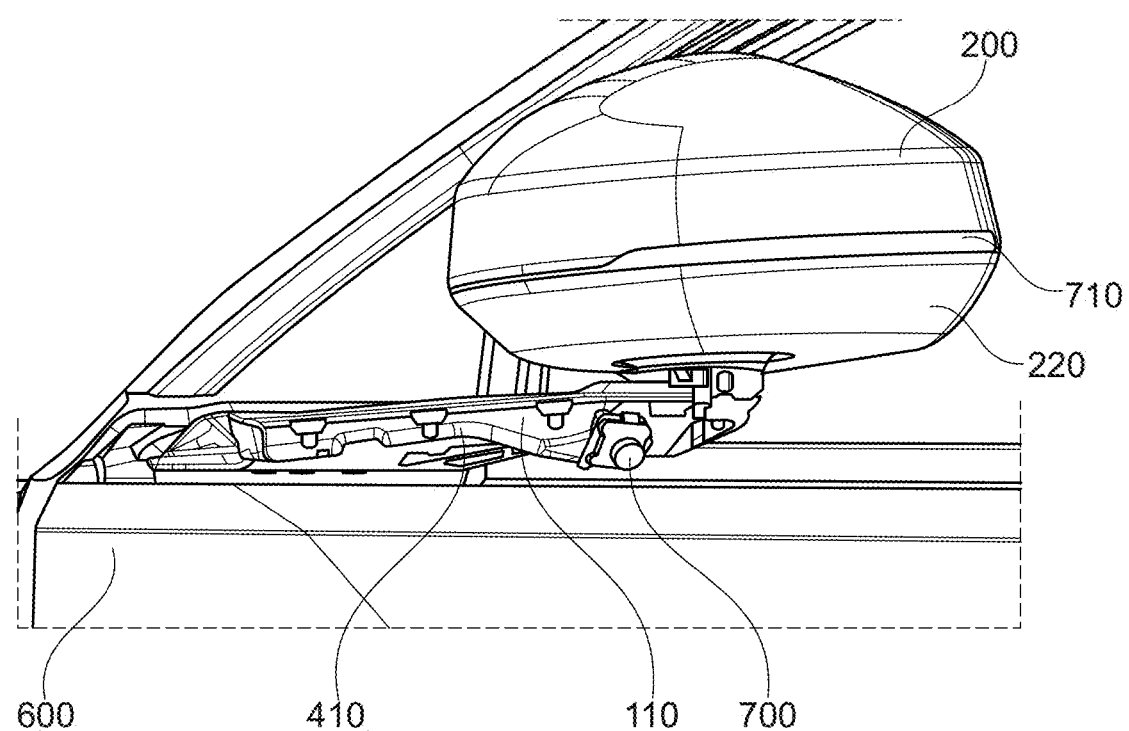
Figure 15C:
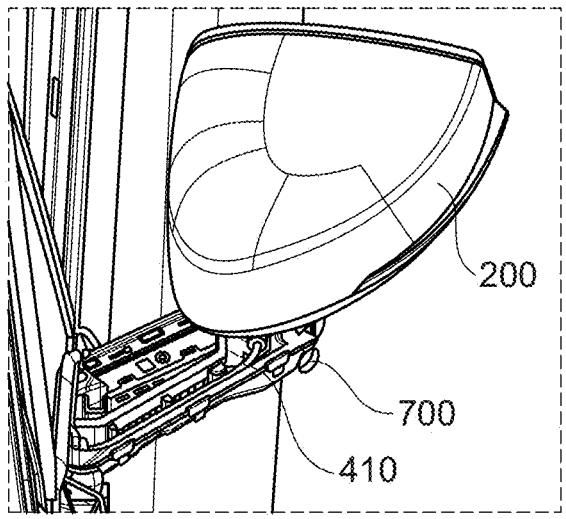
Figure 15E:
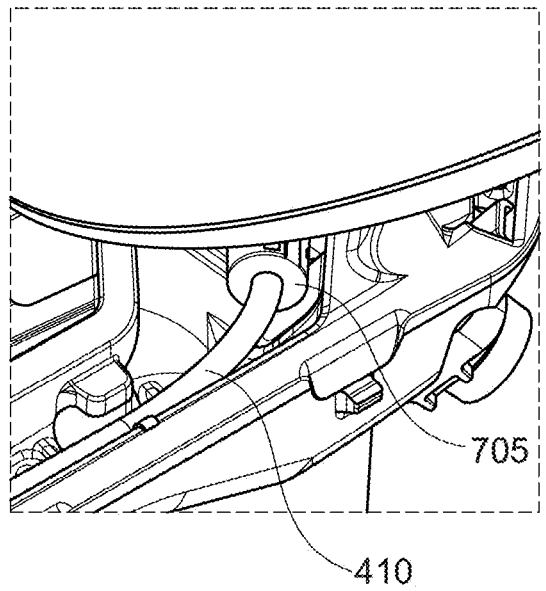
Figure 15D:
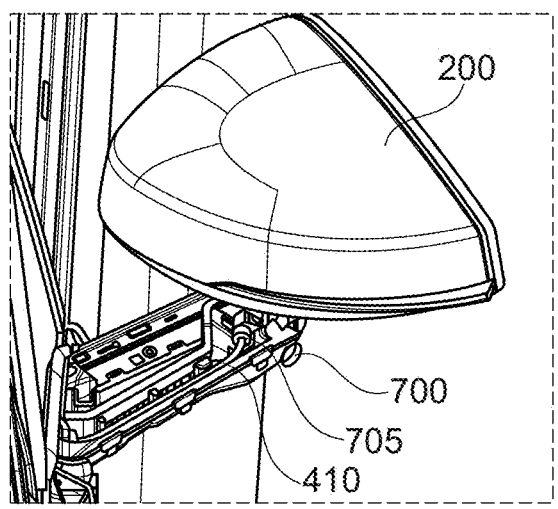
Figure 15F:
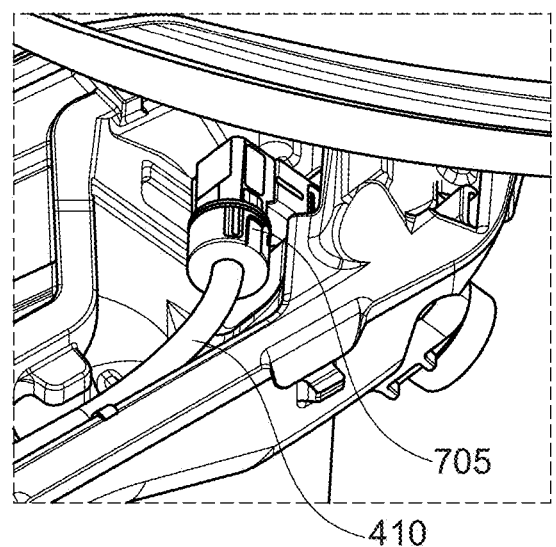

To gain access to a camera connector 705 at the end of the camera harness 410, the head assembly 200 must be set into a knock forward position and locked into place so two hands can be used to remove the camera 700 and its connector 705, with FIGS. 15c and 15b demonstrating the rotation of the head assembly 200 into said knock forward position, and details of the camera connector access is shown in the enlarged illustrations of FIGS. 15e and 15f of parts of FIGS. 15c and 15d, respectively.

Figure 16A:
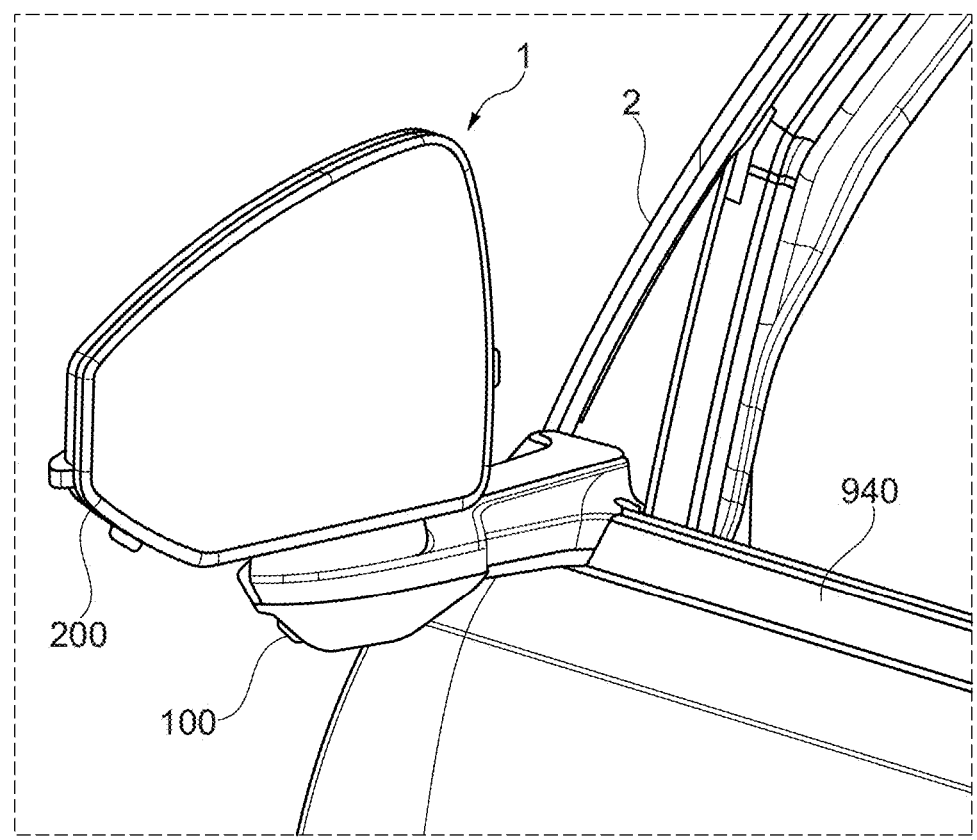
FIGS. 16a to 16l are perspective views demonstrating details of the dis-assembly of all 3 cover pieces.
Figure 16B:
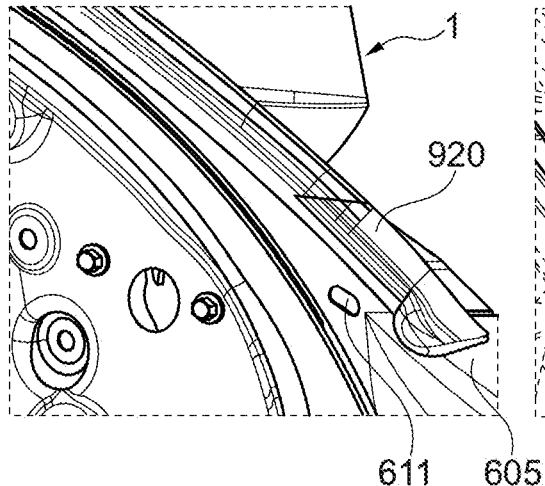
Figure 16C:
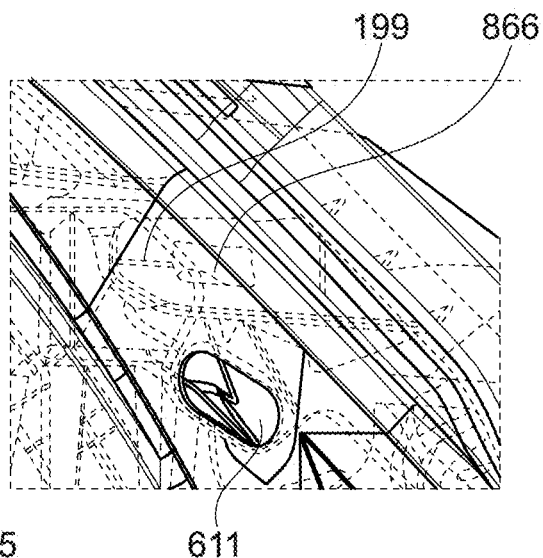
Figure 16D:
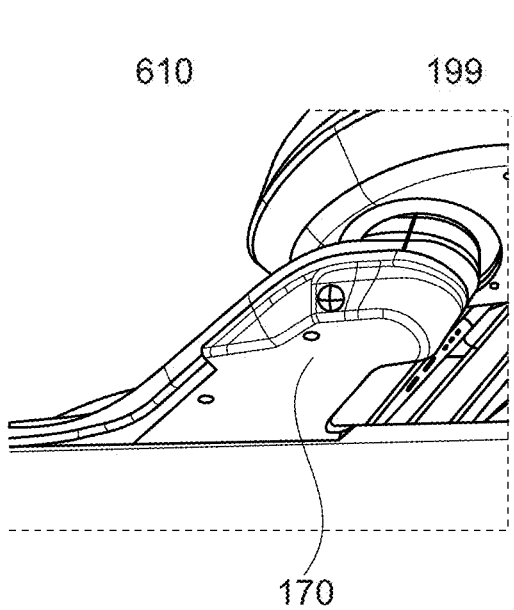
Figure 16E:
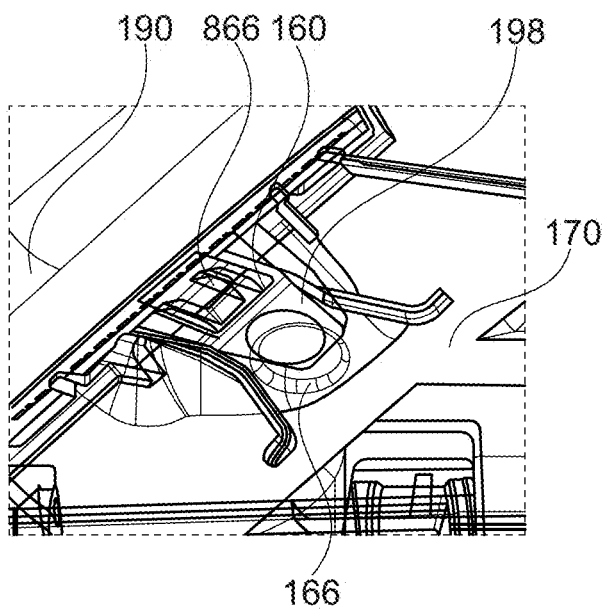

To dis-assemble all three cover pieces 170, 180 and 190 only one tool is needed for dis-lodging or dis-engaging clip connections, as explained in the following with respect to FIGS. 16a to 16l. In FIGS. 16a the assembled exterior rear view device 1 mounted to the vehicle 2 is shown, in another perspective compared to FIG. 15a and the following five steps as required for the dis-assembly:

In a first step, the hoop clip 199 shown in FIG. 13i is accessed through a slot 611 in the door panel 605 to loosen the engagement with the projection 866 of the door gasket substrate 804, see FIGS. 16b and 16c In a second step, shown in FIGS. 16 d and 16e, the clip 198 of the upper base cover 190 engaging the pocket 16 of the lower base cover 170, see FIG. 13h, is loosen by passing through the drain hole 166 located in the lower base cover 170, with the drain hole 166.

Figure 16F:
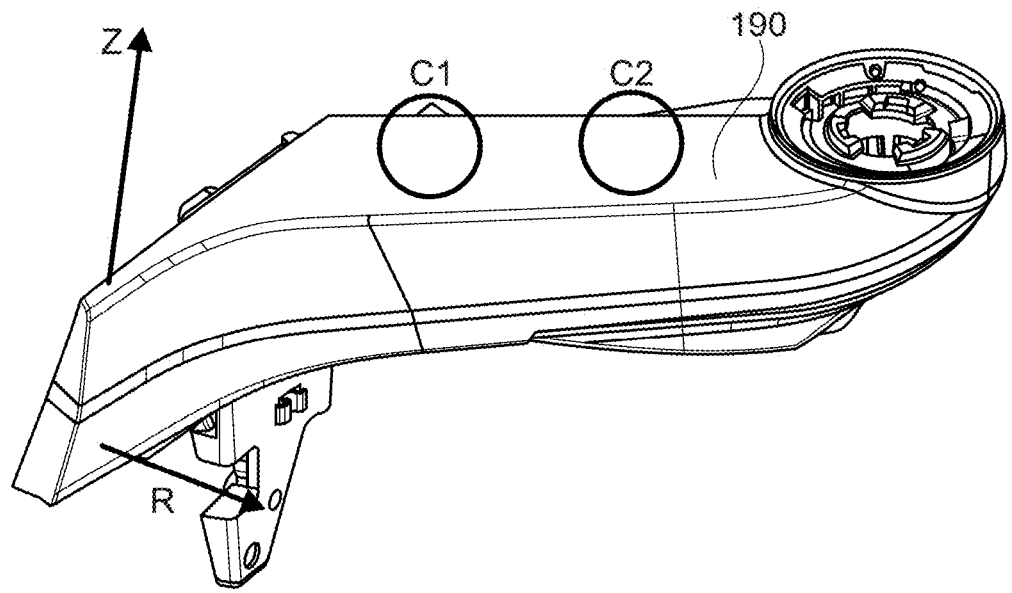
Figure 16G:
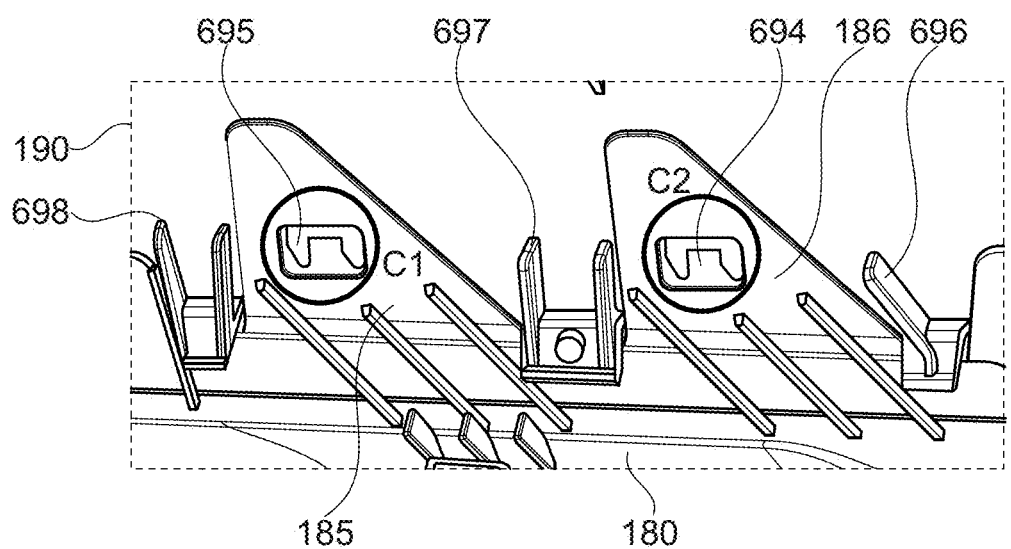

In a third step, shown in FIG. 16f, the upper base cover 190 is removed by a compound movement, namely an upward movement in Z-direction and a rotation out along the arrow R. To allow said compound movement of the upper base cover 190, the same must be pulled up to dis-engage the two clips 185 and 186 of the base cover cap 180, i.e. to loosen the engagement shown in FIG. 13g. The location of the respective clip connections are indicated by C1 and C2 in FIGS. 16f and 16g.

Figure 16H:
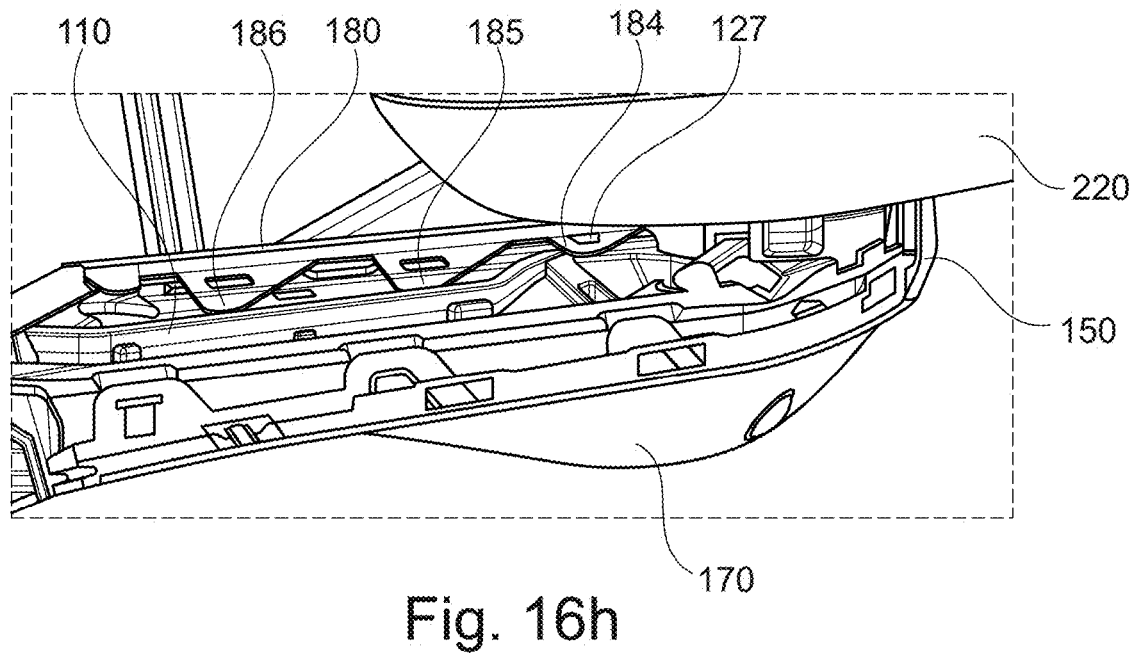
Figure 16I:
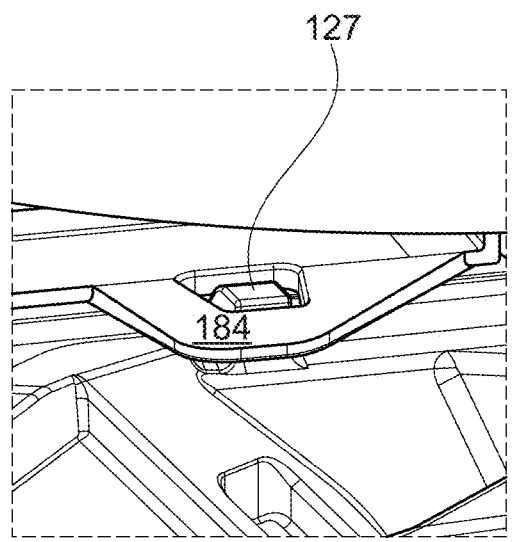
Figure 16J:
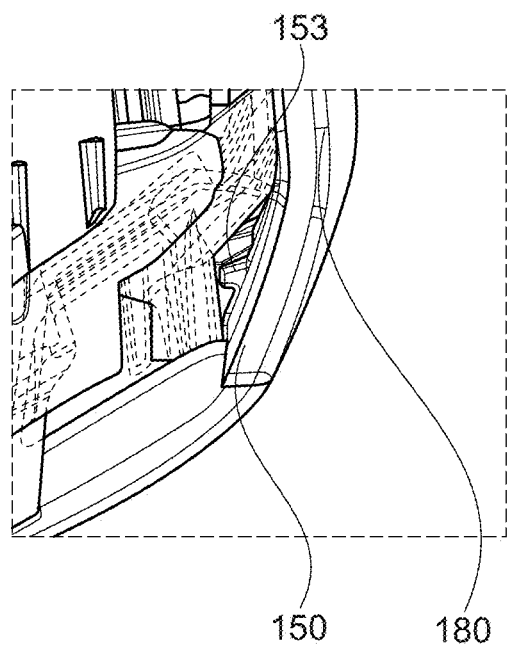

In a fourth step, shown in FIGS. 16h to 16j, to dismount the base cover cap 180, its clip 184 positioned by a projection 127 of the base frame 110 (FIG. 16i) and its peg projections 153 positioned by the lower base cover 170 (FIG. 6j) must be dis-engaged. The clip dis-engagement of FIG. 16i will require the tool, while the peg projections dis-engagement of FIG. 16j simply needs to be pushed out of position, such that the base cover cap 180 will rotate out.

Figure 16K:
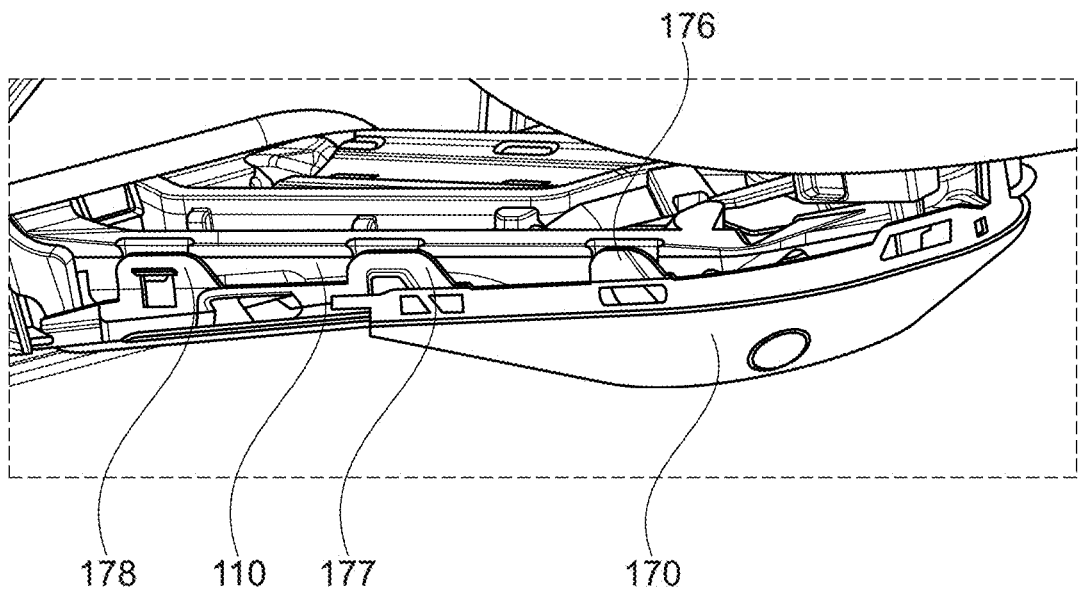
Figure 16L:
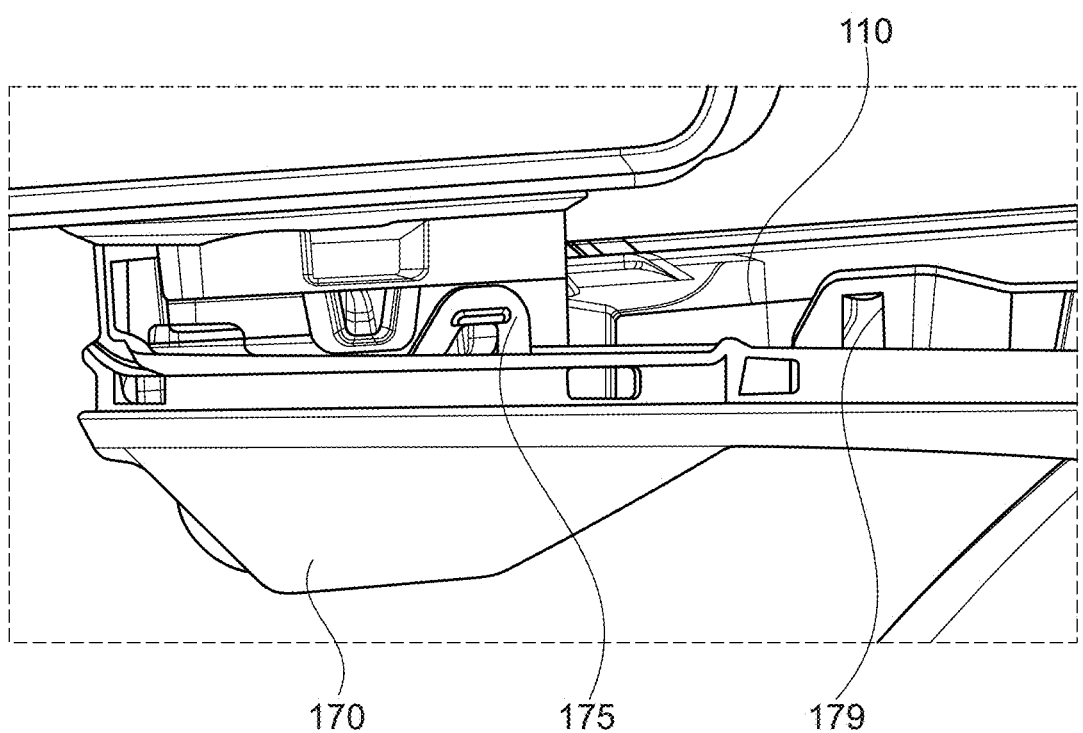

In a fifth step, the five clips 175 to 179 of the lower base cover 170 shown in FIGS. 16k and 16l have to be dis-engaged from the base frame 110 such that the lower base cover 170 will naturally fall down in the Z-direction and can be removed.

The tool 2000 needed for dis-lodging or dis-engaging the clip connections to dis-assemble all three cover pieces 170, 180 and 190 is explained in the following with respect to FIGS. 17a to 17c.

Figure 17A:
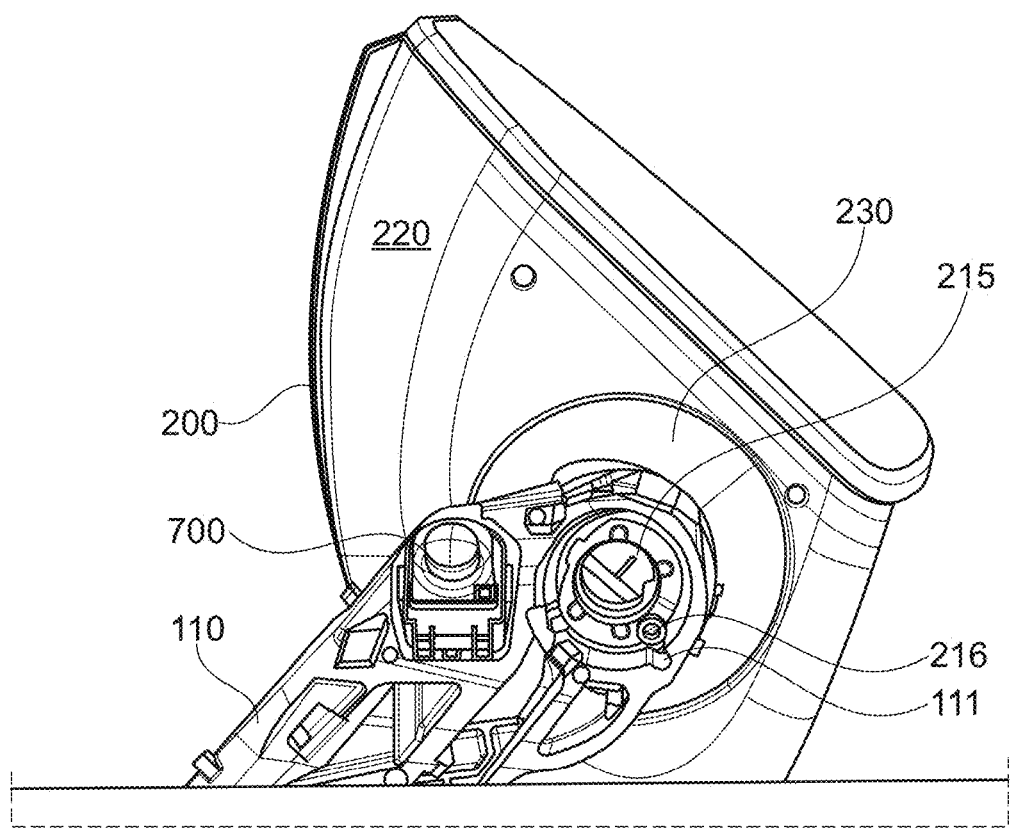
FIGS. 17a to 17c are perspective views demonstrating locking the head assembly during dis-assembly of the camera as shown in FIGS. 15d and 15f.
Figure 17B:
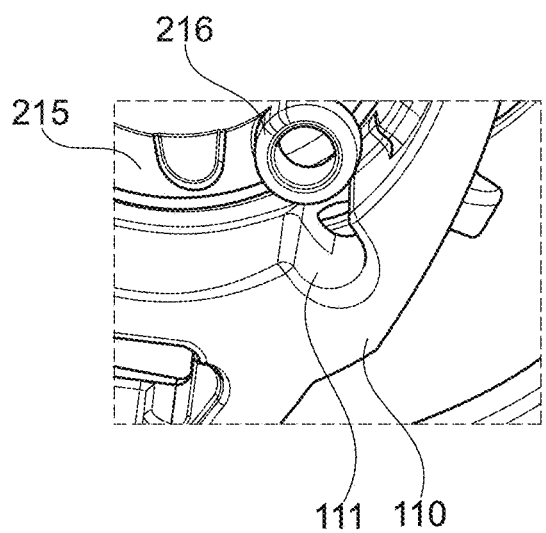
Figure 17C:
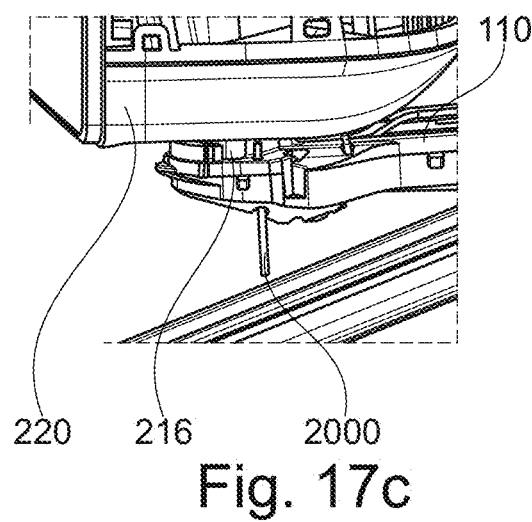

To avoid the mirror head assembly 200 rotating back into its nominal position, that is from the position shown e.g. in FIGS. 15d, 15f and 17a into the position shown e.g. in FIGS. 15c and 15e, due to a self-return spring mechanism (not shown) and via a pivot joint 230, the tool 2000 with a maximum diameter of 4 mm may be used to lock the base frame 110 relative to the head assembly 200. For that purpose the recess or hole 111 is designed into the base frame 110, which provides easy access to a mechanical stop 216 of a case frame 215 from the bottom of the base assembly 100, after removing the three cover pieces 170, 180 and 190.

All parts the tool 2000 interfaces with are made from aluminum for maximal strength and security. Also the tool 2000 itself may be made out of aluminium.

In summary, the three cover pieces of the present disclosure, namely the lower base cover 170, the base cover cap 180 and the upper base cover 190 are designed
- to easily mantle the base frame 110 without screw connections, but only via clip, snap and/or latch connections amongst themselves as well as the retainer assembly 300, in particular the sealing means 800, and the base frame 110, for providing an aesthetically pleasing appearance as well as accident-proof by avoiding sharp edges and, in addition, for allowing an adaption of the base assembly design to the vehicle design in an easy manner;
- to provide an opening 702 for the camera 700 attached to the base frame 110 via the camera cradle 704, without scratching the camera lens during assembly; and
- to easily dis-mantle the base frame 110 due to said clip, snap and/or latch connections, in particular making usage of only one tool, especially for camera service.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS 1 exterior rear view device
2 vehicle
100 base assembly
101 clip
102 clip
103 clip
104 clip
105 clip
106 clip
107 clip
108 hook aperture
109 hook aperture
110 base frame
111 hole
115 door attachment portion
116 arm
117 head attachment portion
118 hook aperture
120 location pin
121 T shaped location projection
122 camera guiding wall
123 camera harness guiding channel portion
124 opening for harness holder
125 location projection
126 location projection
127 location projection
131 screw opening
132 screw opening
135 step for sealing means clip
136 step for sealing means clip
137 opening for retainer means clip
138 opening for sealing means clip
140 harness guiding channel portion
141 harness guiding channel portion
150 projection
151 slot
152 tab
153 projection
160 pocket
161 opening
162 opening
163 wall
164 opening
165 opening
166 drain hole
167 opening
168 opening
170 lower base cover
171 multi-functional assembly projection
172 hook
173 hook
174 hook
175 clip
176 clip
177 clip
178 clip
179 clip
180 base cover cap
184 clip
185 clip
186 clip
190 upper base cover
192 location projection
193 location projection
194 location projection
195 location projection
198 clip
199 hoop clip
200 head assembly 210 actuator assembly
215 case frame
216 mechanical stop
220 lower case
222 opening of lower case
230 pivot joint
300 retainer assembly
301 retainer means
310 sealing portion
315 clip
316 clip
320 holding portion
322 opening for location pin
340 camera harness guiding channel portion
350 hook
351 opening for arm of T shaped location projection
360 clip
371 opening
372 opening
380 opening for sealing means clip
391 T-slot
400 harness
410 camera harness
420 guiding channel
500 harness holder
510 fixing tie
520 clip
600 door
605 door panel
610 opening for hook
611 slot
620 opening for location pin
631 screw opening
632 screw opening
640 cheater panel
691 location peg
692 location peg
694 clip retention extension
695 clip retention extension
696 alignment projection
697 alignment projection
698 alignment projection
700 camera
702 opening
704 camera cradle
705 camera connector
710 turn signal indicator
742 location rib
744 clip
746 anti-backout projections
800 sealing means/2K door gasket
802 door gasket seal
804 door gasket substrate
810 clip
820 clip opening
830 clip
840 clip
850 datum area for upper case
851 T-slot
860 hook pocket
862 hook pocket
866 projection
870 rib
872 rib
881 screw opening
882 screw opening
900 channel
920 glass run seal
922 sealing lip
940 wait finisher
1000 window
2000 tool

The invention claimed is:

1. A base assembly of an exterior rear view device to be mounted to a vehicle, comprising:
a base frame formed with a door attachment portion for attachment to a door of the vehicle, a head attachment portion for moveable attachment of a head assembly, and an arm between said attachment portions;
a cover made out of three pieces to mantle the arm from the door attachment portion to the head attachment portion only via at least one of a snap, clip, or latch connections;
a camera cradle in form of a unit for attaching a camera to the base frame;
a retainer in form of a unit arranged on the door attachment portion for guiding and sealing a harness;
a seal attached to the door attachment portion; and
a harness holder for attachment of the harness to the door attachment portion,
wherein
the three cover pieces are three plastic cover pieces,
the three cover pieces comprise a lower base cover, a base cover cap and an upper base cover, and
the three cover pieces are connected by at least one of the clip, snap, or latch connections, with said connections being provided between the three cover pieces, the seal and the base frame.

2. The base assembly of claim 1, wherein
the lower base cover is provided with an opening for the camera attached to the base frame or a drain hole;
the lower base cover is provided with five clips and a multi-functional assembly projection for attachment to the base frame;
the lower base cover is provided with three hooks for attachment to a door gasket substrate of the seal;
the lower base cover has an edge to engage a door seal gasket of the seal or for an outer sealing;
the lower base cover is provided with at least one third attachment means for attachment to the base cover cap, comprising a multi-functional assembly projection and openings, or
the lower base cover is provided with at least one fourth attachment means for attachment to the upper base cover, comprising a pocket and openings.

3. The base assembly of claim 1, wherein
the base cover cap is provided with at least one fifth attachment means for attachment to the lower base cover, comprising peg like projections and a tab;
the base cover cap is provided with at least one sixth attachment means for attachment to the upper base cover, comprising peg like projections, a slot and two clips, in form of two leaf spring clips adapted to rest on the base frame at a root and end, allowing a middle portion therebetween to flex downwards; or
the base cover cap is provided with at least one seventh attachment means for attachment to the base frame, comprising the at least one clip.

4. The base assembly of claim 1, wherein
the upper base cover is provided with at least one eighth attachment means for attachment to the lower base cover, comprising location pegs or the at least one clip;
the upper base cover is provided with at least one ninth attachment means for attachment to with the base cover cap, comprising clip retention extensions and at least one alignment projection, or the upper base cover is provided with a hoop clip for engagement with a projection of a door gasket substrate.

5. The base assembly of claim 1, wherein the retainer is provided
as a plastic unit,
between the seal and the door attachment portion,
with at least one opening for allowing at least one datum structural element of the door attachment portion to pass thereto,
with at least one guiding projection or at least one guiding channel portion for providing at least part of a guiding channel for routing or guiding the harness, or
with at least one sealing portion for covering at least a portion of the at least one harness.

6. The base assembly of claim 5, wherein
the at least one opening is provided by a holding portion of the retainer, with a first opening allowing a location pin of the door attachment portion to pass thereto, or
at least one second opening allowing a T shaped location projection of the door attachment portion to pass thereto.

7. The base assembly of claim 5, wherein
at least one of a first hook or clip is provided by the holding portion for attachment to a door panel,
at least one of a second hook or clip is provided by the holding portion for attachment to the door attachment portion, or
the first and second hooks or clips extending in opposite directions.

8. The base assembly of claim 7, wherein
the first hook is adapted to hold the rear view device in Y direction to assist an assembly thereof to the door panel via screws,
the first clip determines a final assembly Z position of the rear view device,
the first clip is arranged next to a first opening,
the first hook provides at least one second opening, or
there are at least two second clips.

9. The base assembly of claim 1, wherein the retainer is provided with at least one of a datum area or with at least one T shaped location projection within a datum area for the upper base cover.

10. The base assembly of claim 1, wherein the harness holder is provided as a plastic unit or comprises a fixing tie for the harness and a clip for engaging an opening of the door attachment portion.

11. The base assembly of claim 1, wherein
the camera cradle is removably secured by a friction fit and without any separable attachment element;
the camera cradle comprises at least one location rib in its interior surface in order to hold the camera securely in place and to provide a tuned position of the camera along an x, y, and z axes;
the camera cradle comprises at least one clip configured to frictionally secure the camera to the camera cradle;
the camera cradle comprises at least one anti-backout projection configured to fictionally secure the camera cradle to the base frame; or
the camera cradle is provided as a plastic unit.

12. The base assembly of claim 11, wherein
the at least one location rib comprises three pairs of location ribs, each pair of location ribs being formed in one of three interior walls of the camera cradle;

the at least one comprises two clips formed at a bottom edge of the cradle, wherein, with the camera inserted in the camera cradle, the bottom edge of the camera cradle is the edge of the camera cradle closest to a lens of the camera; or the at least one anti-backout projection comprises two anti-backout projections formed proximal to a bottom edge of the cradle, wherein, with the camera inserted in the camera cradle, the bottom edge of the camera cradle is the edge of the camera cradle closest to a lens of the camera.

13. The base assembly of claim 1, wherein
the base frame is provided as a metal piece made out of aluminum, and the base frame has a modulus of elasticity between 15 and 75 GPa, or
the base frame is more rigid than the three cover pieces, the camera cradle, the retainer and the harness holder.

14. A base assembly of an exterior rear view device to be mounted to a vehicle, comprising:
a base frame formed with a door attachment portion for attachment to a door of the vehicle, a head attachment portion for moveable attachment of a head assembly, and an arm between said attachment portions;
a cover made out of three pieces to mantle the arm from the door attachment portion to the head attachment portion only via at least one of a snap, clip, or latch connections;
a camera cradle in form of a unit for attaching a camera to the base frame;
a retainer in form of a unit arranged on the door attachment portion for guiding and sealing a harness;
a seal attached to the door attachment portion; and
a harness holder for attachment of the harness to the door attachment portion,
wherein the seal is at least one of
arranged between the retainer and the door attachment portion or between the door attachment portion and at least one of the cover pieces,
formed as a two component door gasket,
comprises a door gasket seal and a door gasket substrate, or
provides a 2-way simultaneous sealing comprising an inner sealing to the base frame and an outer sealing to the lower base cover or to the door panel.

15. The base assembly of claim 14, wherein
the door gasket seal is formed from a rubber, or
the door gasket seal is formed with an S shape cross-sectional geometry, or
the door gasket seal is formed from a rubber and with an S shape cross-sectional geometry, or
the door gasket substrate is formed from plastic, or
the door gasket substrate is formed with at least one of clip, opening, hook pocket, location rib, projection, screw opening or and/or datum area, and/or
the door gasket substrate is formed from plastic and with at least one of clip, opening, hook pocket, location rib, projection, screw opening or datum area, or
the seal is formed in one cavity in a 2K tool.

16. The base assembly of claim 15, wherein
hook pockets provide location and positional control whilst assembling the seal to the base frame,
at least one of the hook pockets or the location ribs are adapted to be assembled with the lower base cover,
at least one of the hook pockets or the location ribs are adapted to lock and locate the seal in all three directions, or
clips are adapted to assemble with the base frame.

17. The base assembly of claim 15, wherein
the clips are adapted to assemble with the base frame, with a second retainer being arranged therebetween, or
the screw openings are adapted for screws to secure the seal, together with the second retainer, to the base frame.

18. The base assembly of claim 15, wherein
the at least one datum area is adapted to locate an upper base cover or to provide a strength of the base frame to the cover thereof, or and
the projection is adapted to secure a whole cover assembly of the base frame by being engaged by a hoop clip of the base cover.

19. A base assembly of an exterior rear view device to be mounted to a vehicle, comprising:
a base frame formed with a door attachment portion for attachment to a door of the vehicle, a head attachment portion for moveable attachment of a head assembly, and an arm between said attachment portions;
a cover made out of three pieces to mantle the arm from the door attachment portion to the head attachment portion only via at least one of a snap, clip, or latch connections;
a camera cradle in form of a unit for attaching a camera to the base frame;
a retainer in form of a unit arranged on the door attachment portion for guiding and sealing a harness;
a seal attached to the door attachment portion; and
a harness holder for attachment of the harness to the door attachment portion,
wherein the base frame, the retainer and the seal provide a channel adapted for positioning or locating a glass run seal.

* * * * *